US011119013B2

(12) United States Patent
Carter et al.

(10) Patent No.: US 11,119,013 B2
(45) Date of Patent: Sep. 14, 2021

(54) EXTRACELLULAR VESICLE ISOLATION BY NANOMEMBRANES

(71) Applicant: SiMPore, Inc., West Henrietta, NY (US)

(72) Inventors: Jared A. Carter, Rochester, NY (US); Akash S. Patel, Utica, NY (US); Cassandra R. Walinski, Lancaster, NY (US); James A. Roussie, Rochester, NY (US)

(73) Assignee: Simpore Inc., West Henrietta, NY (US)

( * ) Notice: Subject to any disclaimer, the term of this patent is extended or adjusted under 35 U.S.C. 154(b) by 0 days.

(21) Appl. No.: 16/600,322

(22) Filed: Oct. 11, 2019

(65) Prior Publication Data

US 2020/0116603 A1    Apr. 16, 2020

Related U.S. Application Data

(60) Provisional application No. 62/744,720, filed on Oct. 12, 2018.

(51) Int. Cl.
| | |
|---|---|
| *B01D 61/02* | (2006.01) |
| *B01L 3/00* | (2006.01) |
| *G01N 1/40* | (2006.01) |
| *B01D 71/02* | (2006.01) |
| *G01N 1/28* | (2006.01) |

(52) U.S. Cl.
CPC ......... *G01N 1/4005* (2013.01); *B01D 61/027* (2013.01); *B01D 71/022* (2013.01); *B01L 3/502753* (2013.01); *G01N 1/28* (2013.01); *B01D 2317/025* (2013.01); *B01L 2200/0647* (2013.01); *B01L 2300/0681* (2013.01);
(Continued)

(58) Field of Classification Search
CPC .......... G01N 1/4005; G01N 2001/4088; B01L 3/502753; B01L 2300/681; B01D 61/027
See application file for complete search history.

(56) References Cited

U.S. PATENT DOCUMENTS

| 7,292,349 B2 | 11/2007 | Miller et al. |
| 9,789,239 B2 | 10/2017 | Striemer et al. |
(Continued)

FOREIGN PATENT DOCUMENTS

WO    WO-2018129429 A1 *  7/2018  ......... G01N 30/0005

OTHER PUBLICATIONS

Li, Pin et al—Progress in Exosome Isolation Techniques—Theranostics, 2017; 7(3): 789-804 (Year: 2017).*
(Continued)

*Primary Examiner* — Bradley R Spies
(74) *Attorney, Agent, or Firm* — Stadler IP Law PLLC

(57) ABSTRACT

Provided are methods, devices, and kits for the isolation of extracellular vesicles using silicon nanomembranes. A method for EV isolation includes the steps of collecting a biofluid sample, contacting the biofluid sample with a pre-filtration membrane, thereby forming a first filtrate and a first retentate, optionally, washing the first retentate of the pre-filtration membrane, contacting the first filtrate from the pre-filtration membrane with a capture membrane, thereb forming a second filtrate and a second retentate, optionally, washing the second retentate, and eluting the second retentate from the capture membrane or lysing the second retentate to recover the contents.

13 Claims, 16 Drawing Sheets

(52) U.S. Cl.
CPC ............. *B01L 2300/0896* (2013.01); *G01N 2001/4016* (2013.01)

(56) References Cited

U.S. PATENT DOCUMENTS

| | | | |
|---|---|---|---|
| 9,899,212 B2 | 2/2018 | Shestopalov et al. | |
| 10,391,219 B2 | 8/2019 | Striemer et al. | |
| 2006/0278580 A1* | 12/2006 | Striemer | B01D 67/0062 210/650 |
| 2016/0199787 A1* | 7/2016 | Striemer | B01D 63/088 216/56 |

OTHER PUBLICATIONS

Bioo Scientific—ExoMir Kit Manual, Catalog # 5145-2014 (Year: 2014).*

Yamada, Kazunari et al—Ewing sarcoma cells secrete EWS/Fli-1 fusion mRNA via microvesicles—PLoS One, 2013 (Year: 2013).*

* cited by examiner

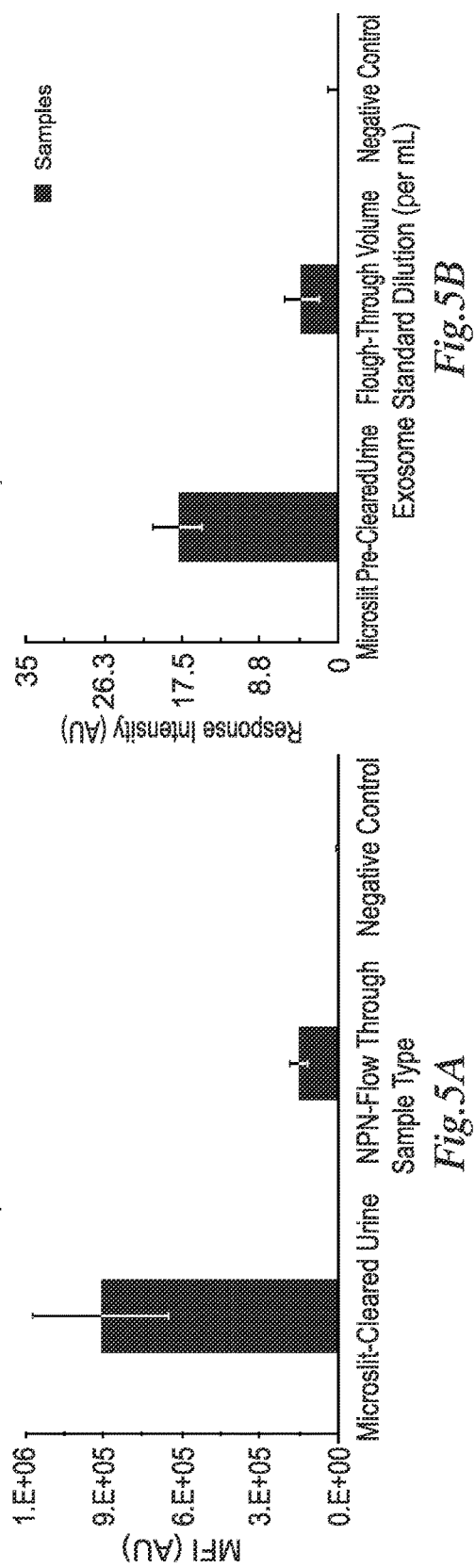
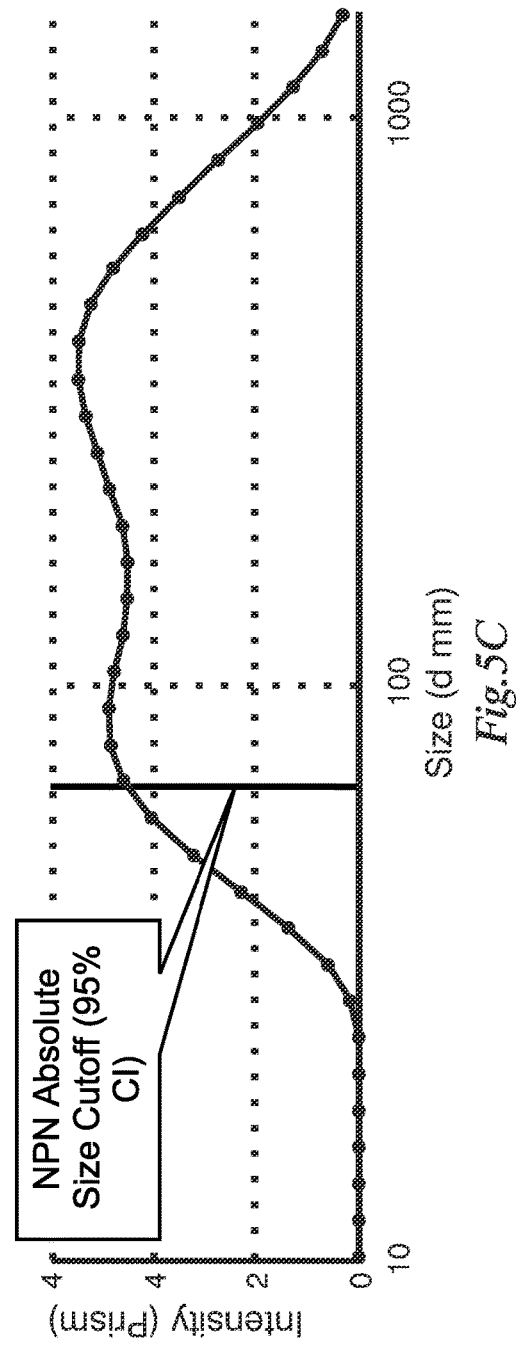
Fig.5A
Fig.5B
Fig.5C

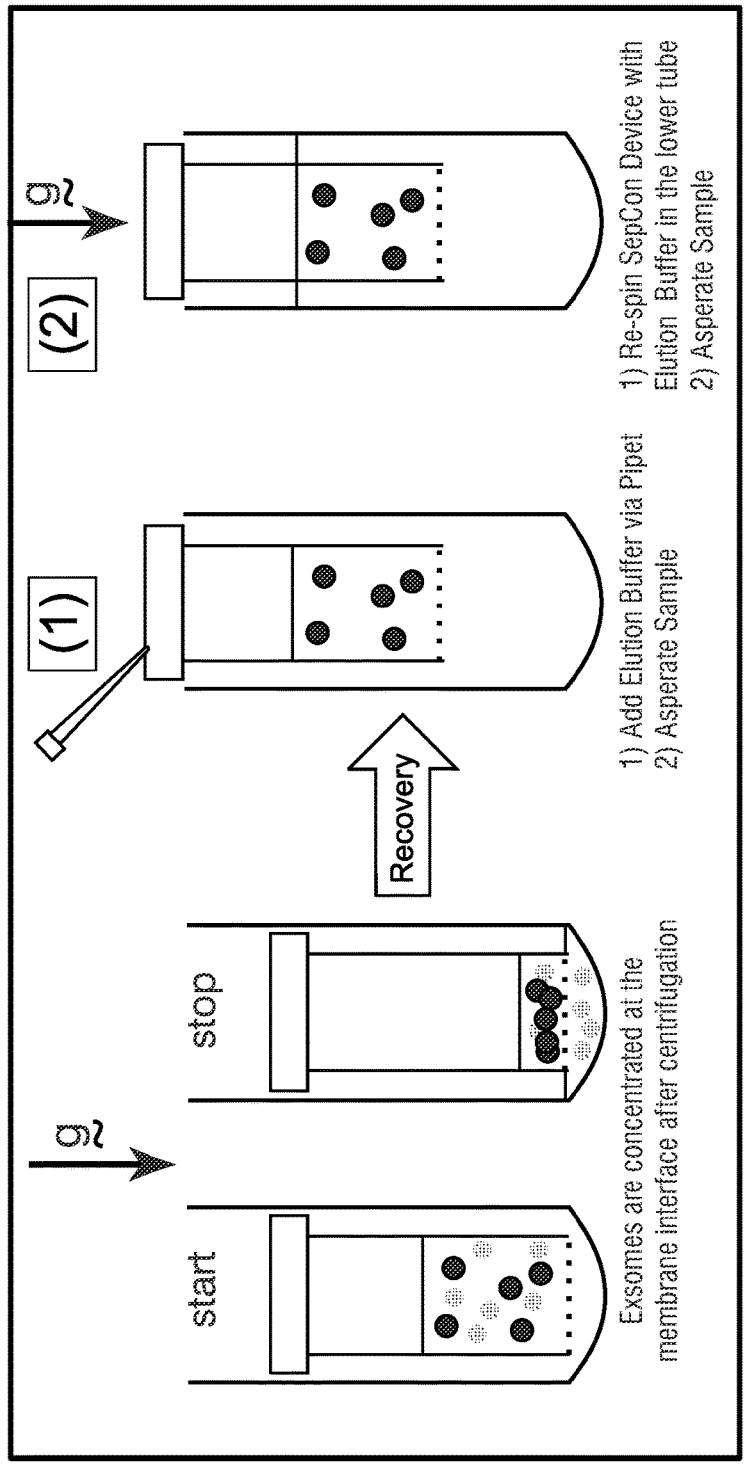

Fig. 6A

Method 1:
1) Elution buffer is added to the SepCon device
2) Pipetting action is used to recover exosomes from the membrane surface
3) Aspirate elution buffer volume to recover sample

Fig. 6B

Method 2:
1) Elution buffer is added to a new collection microtube
2) The SepCon device is added to the tube and re-spun, forcing elution buffer back through the membrane, solubilizing exosomes
3) Aspirate elution buffer volume to recover sample

Fig. 6C

EDX of NPN membranes Pre + Post Recovery
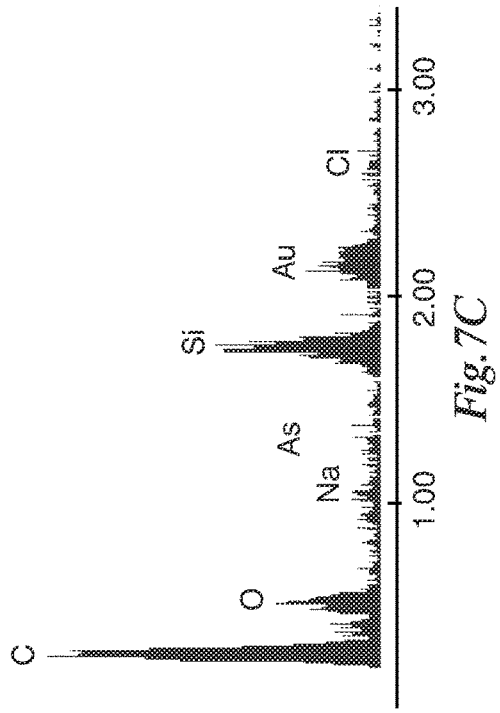
Fig. 7C
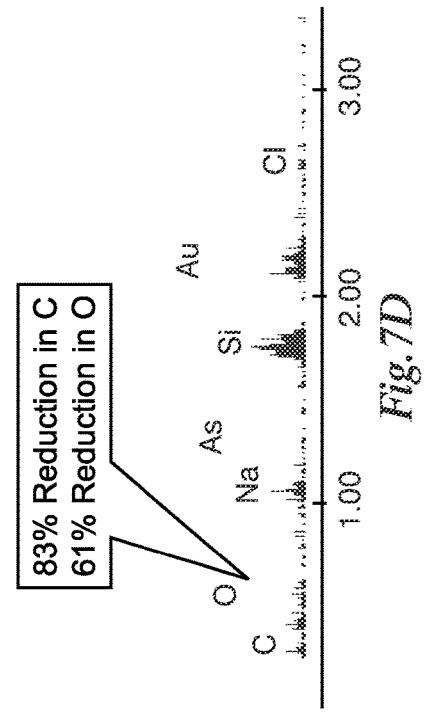
83% Reduction in C
61% Reduction in O
Fig. 7D
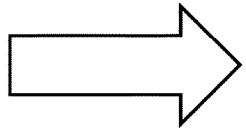
Exosomes retained on NPN Membrane → Exosomes eluted from NPN Membrane
SEM of NPN membranes Pre + Post Recovery
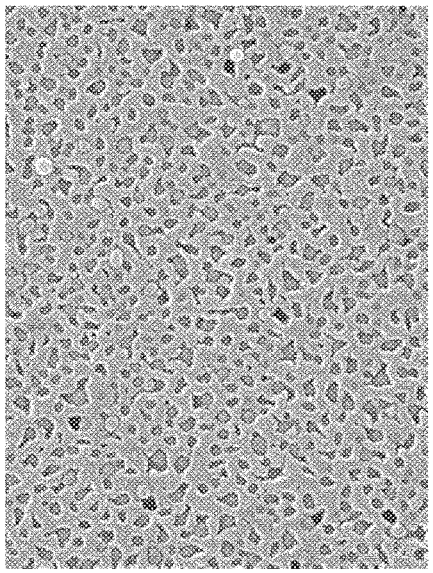
Fig. 7A
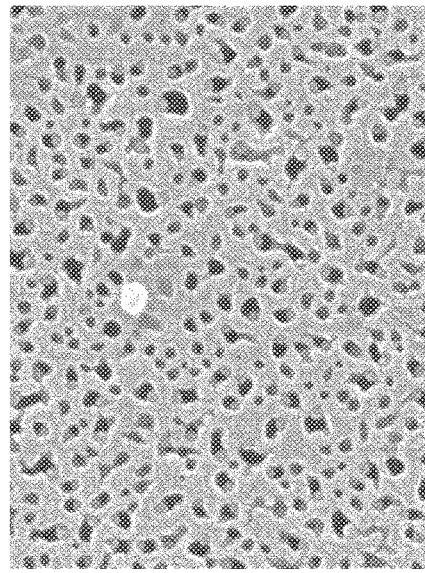
Fig. 7B

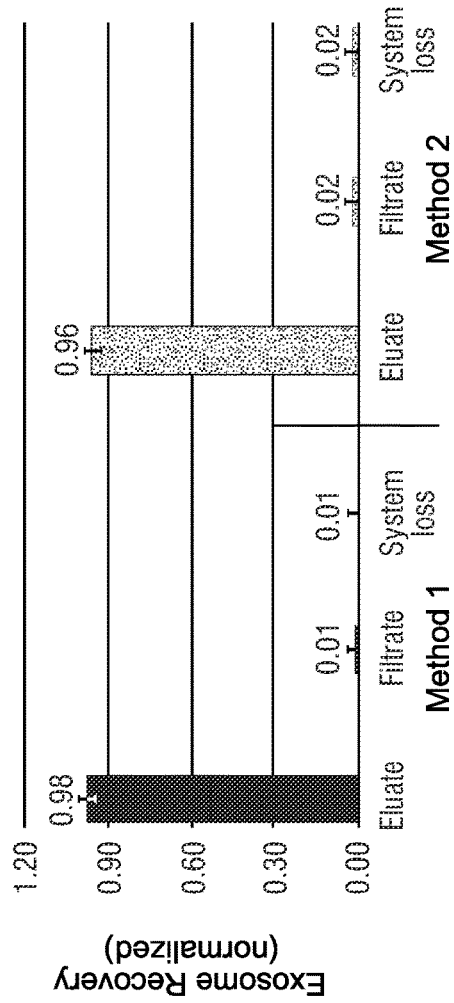
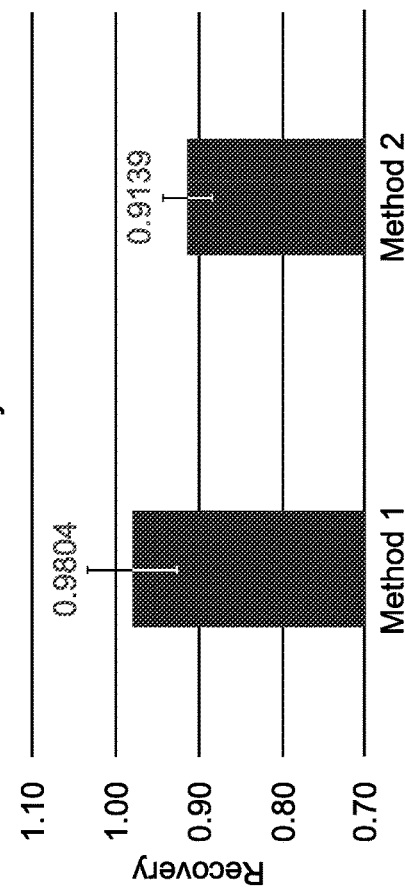

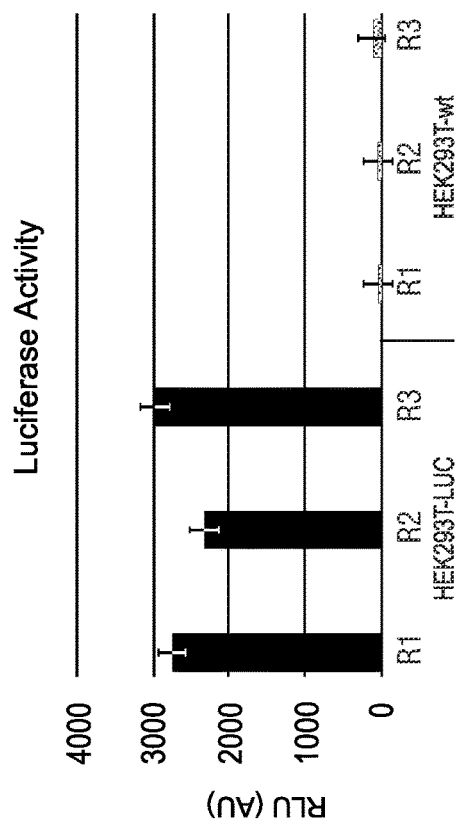
*Fig. 9*
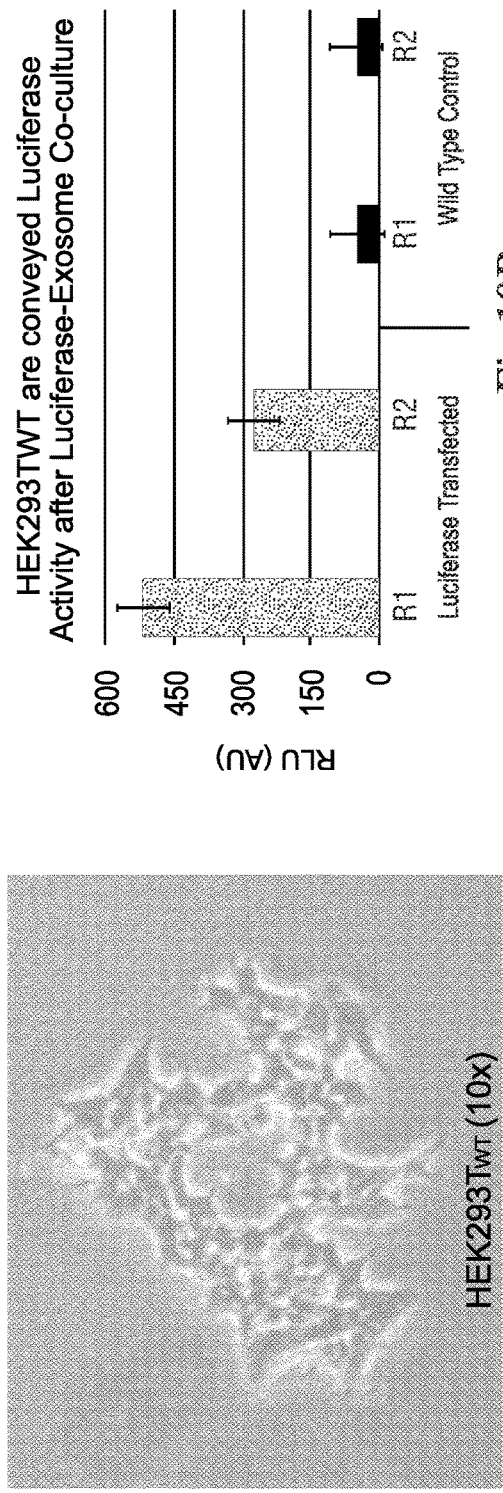
*Fig. 10B*
*Fig. 10A*

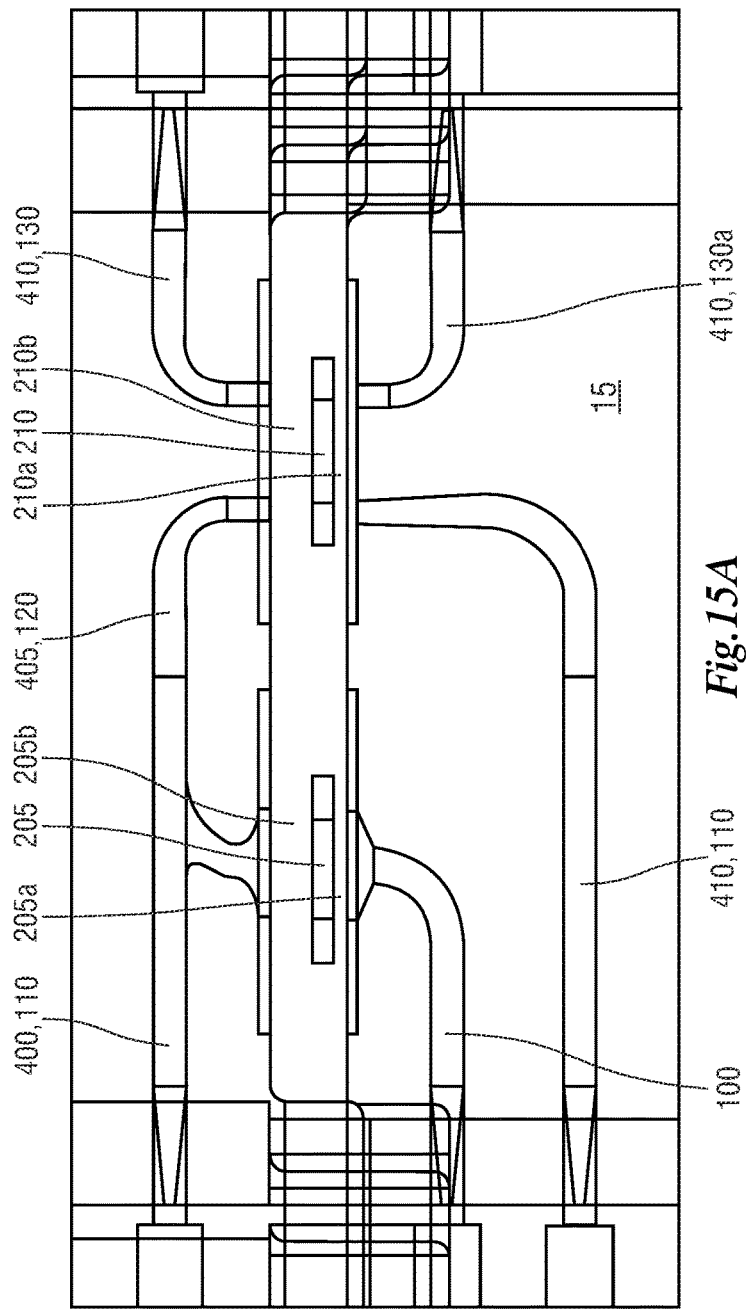
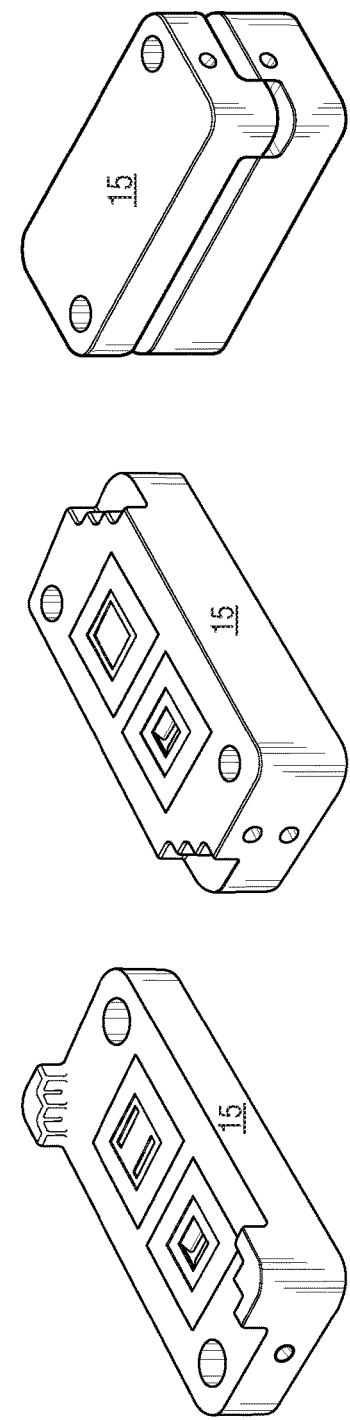
Fig.15A Fig.15B Fig.15C Fig.15D

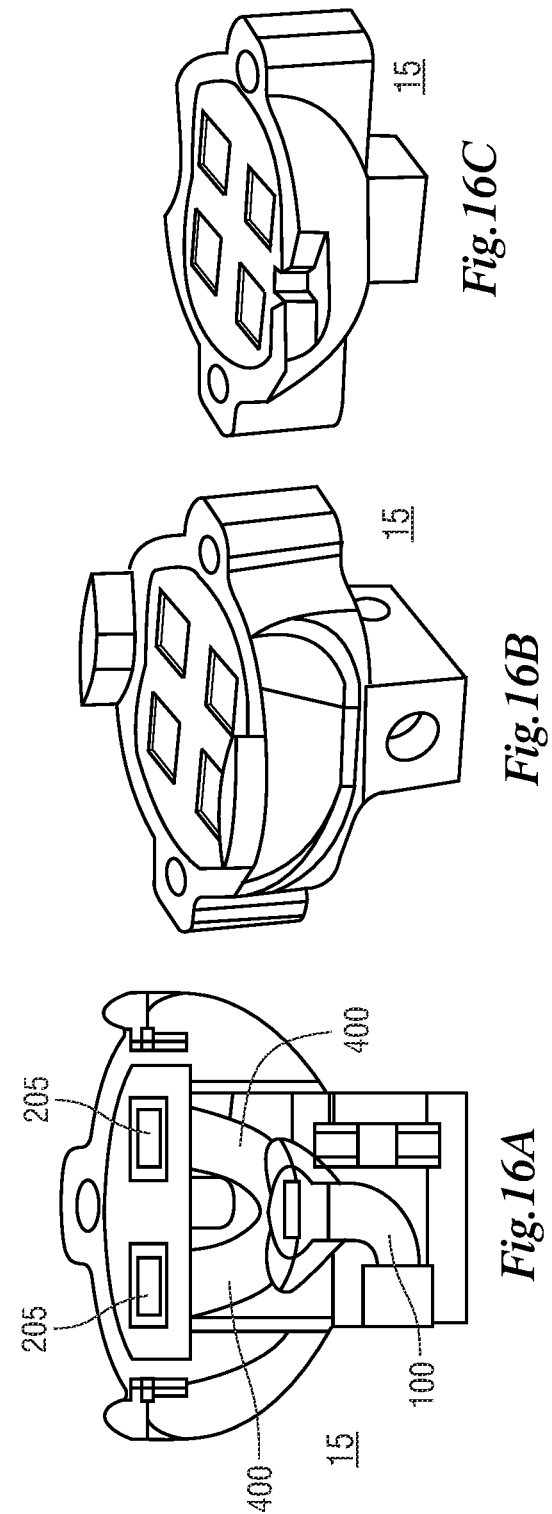

EXTRACELLULAR VESICLE ISOLATION BY NANOMEMBRANES

CROSS-REFERENCE TO RELATED APPLICATIONS

This application is a Nonprovisional Application of U.S. Provisional Application No. 62/744,720, filed Oct. 12, 2018, the disclosure of which is incorporated herein by references.

STATEMENT REGARDING FEDERALLY SPONSORED RESEARCH

This invention was made with government support under contract no. IIP1660177 awarded by the National Science Foundation. The government has certain rights in the invention.

FIELD OF INVENTION

This invention is directed to novel devices, methods, and kits for isolating extracellular vesicles (e.g., microvesicles and exosomes) from biofluids using silicon nanomembranes as filters for such isolation.

BACKGROUND OF THE DISCLOSURE

Membrane vesicles that are shed by cells are referred to collectively as extracellular vesicles (EVs). They comprise lipid bilayer vesicles that are generally considered to be derived from plasma membrane pathways in the case of microvesicles or endosomal pathways in the case of exosomes.

Although EV sizes (in terms of diameter) are heterogeneous, microvesicles are generally considered to range from 200 nm to 1,000 nm in diameter, whereas exosomes are generally considered to range from 30 nm to 200 nm in diameter.

EVs from various cell sources have been extensively studied with respect to protein and lipid content. Recently, EVs have been found to also contain both DNA and RNA, including genomic DNA, cDNA, mitochondrial DNA, microRNA (miRNA), transfer RNA (tRNA), and messenger RNA (mRNA).

Due to the genetic and proteomic information contained in EVs shed by cells, current research is directed at utilizing EVs to gain further insight into the status of these cells; for example, disease state or predisposition for a disease (i.e., prognosis).

In addition to diagnosis and prognosis usages of EVs, forms of EVs (e.g., exosomes) hold potential as therapeutics. For instance, EVs (e.g., exosomes) can be used as drug delivery vehicles or as cancer vaccination agents. Further, EVs (e.g., exosomes) from certain cell populations (e.g., stem cells) have demonstrated therapeutic properties. Such therapeutic usages of the EVs requires intact and biologically functional vesicles.

Accordingly, there is a need for methods of isolating EVs from biological samples that are rapid, low-cost, offer ease of use in research, clinical and biomanufacturing settings, all the while preserving EV integrity and bioactivity. Such methods need to handle the matrix complexities of biofluids (e.g., abundance of cells, cellular debris, and/or proteins). Such methods would find utility by providing isolated EVs for accurate diagnosis of medical conditions and diseases or for biomanufacturing of EV-based therapeutics.

SUMMARY OF THE INVENTION

Accordingly, it is the subject of this invention to provide a method for the isolation of EVs from a biofluid sample. In one embodiment, the method comprises the steps of collecting a biofluid sample 100, filtering the biofluid sample 100 using at least one nanomembrane, and recovering (i.e., eluting) the isolated EVs 105.

Optional steps of washing the membranes used for the filtration steps may be included in the method. As an alternative to recovery (i.e., elution) of the isolated EVs 105, the isolated EVs 105 may be lysed so that their contents can be recovered and purified.

The recovered (i.e., eluted) and/or lysed and purified EV contents may be further assessed by any one of a number of analytical assays.

In one embodiment, a method for EV isolation comprises the steps of:
a) collecting a biofluid sample 100;
b) contacting the biofluid sample with a pre-filtration membrane 205, thereby forming a first filtrate 120 and a first retentate 125;
c) optionally, washing the first retentate 125 of the pre-filtration membrane 205;
d) contacting the first filtrate 120 from the pre-filtration membrane 205 with a capture membrane 210, thereby forming a second filtrate 130 and a second retentate 130;
e) optionally, washing the second retentate 130;
f) eluting the second retentate 130 from the capture membrane 210; or
g) alternatively to f), lysing the second retentate 130 to recover their contents.

The biofluid sample 100 may be any suitable bio fluid sample as described below. The first filtrate 120 is the flow-through volume that is not captured by the pre-filtration membrane 205. The first retentate 125 includes unwanted matrix species. The second filtrate 130 is the flow-through volume that is not captured by the capture membrane 210 and contains unwanted matrix species. The second retentate 130 contains the desired EVs.

The collection of the biofluid sample 100 may comprise, for example, a venous puncture blood draw, a urine specimen collected in a specimen cup, induced or swab-collected saliva, cerebral spinal fluid, amniotic fluid, or cell culture growth media, or any other suitable biofluid.

BRIEF DESCRIPTION OF THE DRAWINGS

For a fuller understanding of the nature and objects of the disclosure, reference should be made to the following detailed description taken in conjunction with the accompanying figures.

FIGS. 5A-5C depict capture of EVs from a biofluid using capture membranes of the present disclosure, wherein the biofluid sample was initially pre-filtered using pre-filtration membranes of the present disclosure.

FIGS. 6A-6C depicts two processes for eluting EVs from capture membranes of the present disclosure.

FIG. 7A-7D depict elution efficiency of EVs from capture membranes of the present disclosure, wherein two elution methods were compared.

FIGS. 8A-8B depict results from an evaluation of EV elution efficiency from capture membranes of the present disclosure.

FIG. 9 depicts results from a characterization of EVs produced by cells.

FIG. 10A-10B depict results from a cell uptake assay of EVs isolated by capture membranes of the present disclosure.

FIG. 15A depicts a cross section of a device of the present disclosure.

FIG. 15B depicts an upper section of a device of the present disclosure.

FIG. 15C depicts a lower section of a device of the present disclosure.

FIG. 15D depicts a fully assembled device of the present disclosure.

FIG. 16A depicts a cross section schematic of a device of the present invention.

FIG. 16B depicts an upper cross section of a device of the present invention.

FIG. 16C depicts a lower section of a device of the present invention.

DETAILED DESCRIPTION OF THE INVENTION

Figure 1:
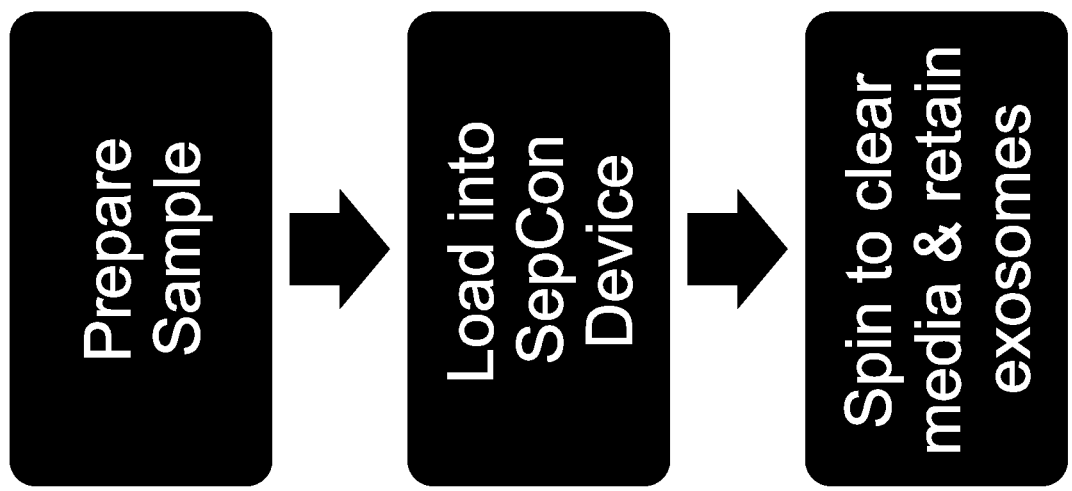
FIG. 1 depicts a process to isolate EVs using nanomembrane devices of the present disclosure.

This application claims the benefit of U.S. Provisional Application No. 62/744,720, filed Oct. 12, 2018.

Although the disclosed subject matter will be described in terms of certain embodiments or examples, other embodiments or examples, including embodiments or examples that do not provide all of the benefits and features set forth herein, are also within the scope of this disclosure. Various structural, logical, and process step changes may be made without departing from the scope of the disclosure.

The steps of the method described in the various embodiments and examples disclosed herein are sufficient to carry out the methods of the present disclosure. Thus, in an embodiment or an example, a method consists essentially of a combination of steps of the methods disclosed herein. In another embodiment or example, a method consists of such steps.

Ranges of values are disclosed herein. The ranges set out a lower limit value and an upper limit value. Unless otherwise stated, the ranges include all values to the magnitude of the smallest value (either lower limit value or upper limit value) and ranges between the values of the stated range.

The present invention provides novel devices, methods, and kits for EV isolation from a biofluid sample using silicon nanomembranes as filters for such isolation.

In the various examples of the disclosure, EVs may comprise both microvesicles and exosomes, unless otherwise specified. Throughout the disclosure, EVs may be referred to collectively as extracellular vesicles, EVs, or vesicles, or may be referred to separately as microvesicles or exosomes.

The present invention provides for the use of silicon nanomembranes for the isolation of EVs from biofluid samples. The present invention further provides fluidic devices incorporating such silicon nanomembranes for carrying out the methods of the disclosure. In various examples throughout the disclosure, such silicon nanomembranes may be referred to collectively as silicon nanomembranes, nanomembranes, membrane filters, filters, membranes, and individually as pre-filtration (or pre-filtering) membranes or capture membranes.

The present disclosure further provides methods for the isolation of EVs using nanomembranes. In various examples throughout the disclosure, such methods may comprise filtration and may further comprise pre-treating (i.e., pre-filtering) to remove unwanted matrix species using a pre-filtration silicon nanomembrane, followed by capturing of the EVs from the filtrate (i.e. flow-through volume) of the pre-filtration membrane using capture silicon nanomembranes. Thus, the methods disclosed herein may comprise use of two silicon nanomembranes (e.g., at least one pre-filtration membrane and at least one capture membrane).

The present disclosure further provides devices for carrying out the methods of the invention. Such devices may include fluidic devices, instrumentation, software, and the like.

The present disclosure further provides kits for carrying out the methods of the invention. Such kits may include devices, reagents, solutions, instructions for use, and the like.

COMPONENTS LIST

Fluidic device—10
Microfluidic device—15
filtration column—20
Stirred cell—25
Fluidic chambers—30
Biofluid sample—100
Isolated EVS—105
Wash buffer 110
First filtrate—120
First washed filtrate—120a
First retentate—125
Second filtrate—130
Second washed filtrate—130a
Second retentate—135
First captured EVs—136
First resuspended EVs—136a
Eluted or released EVs—138
Third filtrate—140
Third washed filtrate—140a
Third retentate—145
Second Captured EVs—146
Second resuspended EVs—146a
Lysis filtrate—150
Phase separation agent—155
Organic phase—160
Aqueous phase—165
RNA—170
Prefiltration membrane—205
Cis side of prefiltration membrane—205a Trans side of prefiltration membrane—205b
Capture membrane—210
Cis side of capture membrane—210a
Trans side of capture membrane—210b
First capture membrane support—210c
Second capture membrane—215
Cis side of second capture membrane—215a
Cis side of second capture membrane—215b
Second capture membrane support—215c
Elution solution—300
Storage vessel—310
Lysis solution—320
Fluidic chambers—400
First membrane trans side to second membrane cis side fluidic chamber—405
Plurality of membrane openings—410

In one embodiment, as best depicted in FIGS. 11-14, a method of isolating EVs comprises the steps of collecting a biofluid sample 100, filtering the biofluid sample 100 using at least one nanomembrane, and recovering (i.e., eluting) the isolated EVs 105.

Optional steps of washing the membranes used for the filtration steps may be included in the method. As an alternative to recovery (i.e., elution) of the isolated EVs 105, the isolated EVs 105 may be lysed so that their contents can be recovered and purified.

The recovered (i.e., eluted) and/or lysed and purified EV contents may be further assessed by any one of a number of analytical assays.

In one embodiment, a method for EV isolation comprises the steps of:
a) collecting a biofluid sample 100;
b) contacting the biofluid sample with a pre-filtration membrane 205, thereby forming a first filtrate 120 and a first retentate 125;
c) optionally, washing the retentate 125 of the pre-filtration membrane 205;
d) contacting the first filtrate 120 from the pre-filtration membrane 205 with a capture membrane 210, thereby forming a second filtrate 130 and a second retentate 135;
e) optionally, washing the second retentate 135;
f) eluting the second retentate 135 from the capture membrane 210; or
g) alternatively to f), lysing the second retentate 135 to recover their contents.

The biofluid sample 100 may be any suitable bio fluid sample as described below. The first filtrate 120 is the flow-through volume that is not captured by the pre-filtration membrane 205. The first retentate 125 includes unwanted matrix species. The second filtrate 130 is the flow-through volume that is not captured by the capture membrane 210 and contains unwanted matrix species. The second retentate 135 contains the desired EVs.

The biofluid sample 100 can be collected from a variety of sources. The biofluid sample 100 may be collected from a subject providing such samples. The collection of the biofluid sample 100 may include, for example, a venous puncture blood draw, a urine specimen collected in a specimen cup, induced or swab-collected saliva, cerebral spinal fluid, amniotic fluid, or cell culture growth media collected after an incubation with the cells (i.e., conditioned cell growth media or cell culture supernatant). The biofluid sample 100 may further include arterial whole blood, plasma, serum, sputum, any solutions in contact with biological tissues (such as bodily secretions, discharges, and/or excretions, as well as lavages, swabs and/or aspirates of bodily tissues), among others.

In further examples, the biofluid sample 100 may further include a bodily fluid, including a fluid isolated from anywhere in the body of the subject such as pleural fluid, nipple aspirates, lymph fluid, fluid of the respiratory, intestinal, and genitourinary tracts, tear fluid, breast milk, fluid from the lymphatic system, semen, intra-organ system fluid, ascitic fluid, or tumor cyst fluid. In various examples, the biofluid sample 100 may comprise one or more of any of the foregoing, as well as combinations thereof. Methods for the collection of any of the foregoing biofluid samples 100 are well-known to those skilled in the related art and thus will not be further described.

The filtration steps (i.e., contact with the pre-filtration membrane 205 and capture membrane 210) makes use of high permeability silicon nanomembranes. High permeability nanomembranes are preferred for the disclosed two nanomembrane-based method. Because nanomembranes are generally ultrathin (e.g. 50 nm to 800 nm thick), they offer less permeation resistance when compared to typical polymeric membranes (>1 μm thick). Therefore, in examples disclosed herein, silicon nanomembranes are preferred over polymer membranes.

For purposes of this disclosure, a nanomembrane comprises a filtration media wherein a plurality of openings through the membrane 410 are fluidically accessible on opposing membrane surfaces (i.e., cis- and trans-sides), and wherein the diameter or width of such openings through the membrane comprise an aspect ratio of 1:0.25 to 1:5 (where aspect ratio equals membrane thickness divided by diameter or width of membrane openings), including all aspect ratio values and ranges therebetween. The membrane openings may comprise pores that are cylinders or rectangular prisms, and thus respectively have a corresponding diameter or width and length. In various examples, the silicon nanomembranes are incorporated into fluidic devices (e.g., microfluidic devices, stirred cells, or filtration columns) and such fluidic devices are used for carrying out the methods of the disclosure.

The pre-filtration membrane 205 retains matrix species that are undesired (i.e., forms a first retentate 125 of such species) while allowing the permeation of desired EVs and other incidental species (i.e., forms a first filtrate 120 of such species). Unwanted matrix species may include intact cells, large cellular debris and/or large globular or filamentous proteins.

The pre-filtration membrane 205 may be a microslit or microporous silicon nanomembrane. In an embodiment, the silicon nanomembrane is a microporous silicon nitride membrane (MP SiN). In the various examples, the MP SiN nanomembranes may comprise a micropore diameter of 0.5 μm to 8 μm, including all integer μm values and ranges therebetween. In the various examples, the MP SiN nanomembranes may comprise a thickness of 50 nm to 800 nm, including all integer nm values and ranges therebetween. In one example, the MP SiN membrane comprises a thickness of 400 nm and a pore diameter of 8 μm.

In yet another example, the pre-filtration membrane 205 may comprise a microslit silicon nitride membrane (MS SiN). In the various examples, the MS SiN nanomembranes may comprise a microslit width of 0.2 μm to 9 μm and a microslit length of 5 μm to 50 μm, including all integer μm values and ranges therebetween. In the various examples, the MS SiN nanomembranes may comprise a thickness of 50 nm to 800 nm, including all integer nm values and ranges therebetween. In a preferred example, the MS SiN pre-filtration membrane comprises a thickness of 200 nm, a microslit width of 0.2 μm, and a microslit length of 5 μm. In another preferred example, the MS SiN pre-filtration membrane comprises a thickness of 400 nm, a microslit width of 0.5 µm, and a microslit length of 50 µm.

Microslit membranes provide advantages of precision filtration cut-off property (as determined by the width of the microslit's rectangular prism opening) and improved non-fouling (i.e. higher permeation capacity as determined by the length of the microslit's rectangular prism opening). Both advantageous characteristics of microslit nanomembranes are particularly important when filtering complex matrices like biofluids.

The microslit width and length may be specified according to the characteristics of a particular biofluid sample and its matrix species. In a preferred example, the MS SiN pre-filtration membrane comprising a thickness of 200 nm, a microslit width of 0.2 µm, and a microslit length of 10 µm may be used as the pre-filtration membrane for whole blood, wherein such a membrane retains hemocytes (e.g., leukocytes, erythrocytes, and/or platelets), as well as large and/or abundant proteins (e.g., serum albumin or immunoglobulins).

In a preferred embodiment, the MS SiN pre-filtration membrane 205 comprising a thickness of 400 nm, a microslit width of 0.5 µm, and a microslit length of 50 µm may be used as the pre-filtration membrane 205 for a biofluid sample 100 that is urine or conditioned cell culture growth media, wherein the pre-filtration membrane 205 forms a first retentate 125 by retaining cells (e.g., urothelia or leukocytes in the case of urine), as well as large and abundant proteins (e.g., Tamm-Horsfall protein in the case of urine). Of course, the type of cells and/or proteins in the first retentate 125 retained by the latter pre-filtration membrane 205 with respect to conditioned cell culture growth media depends on the nature of the cells under culture and the cell growth media.

EV isolation methods to date generally use a low speed centrifugation step or a pre-filtration step in order to remove unwanted intact cells, cellular debris and large proteins. For example, a low speed centrifugation step is often used (e.g., 1,200-2,000 g for 20-30 minutes). Alternatively, a pre-filtration membrane 205 with a 0.8 µm diameter pore polymer filter (e.g., a polyestersulfone or polyvinylidene fluoride membrane with 0.8 µm diameter pores) is often used. Such low speed centrifugation or filtration steps may be considered pre-clearing or pre-treating the sample and are generally necessitated by the nature of downstream steps used in current EV isolation methods. Without such pre-clearing or pre-treatments, the complexity of biofluid matrices would overwhelm the other EV isolation methods known to those skilled in the related art (e.g., ultracentrifugation, affinity membranes, gel permeation chromatography columns, volume-exclusion precipitation agents, among others).

The pre-filtration membrane 205 of the present disclosure offers several advantages over typical low speed centrifugation or 0.8 µm pore diameter polymer filters. As one example, the pre-filtration membranes 205 of the present disclosure may remove a greater extent of unwanted matrix species. The pre-filtration membrane 205 can be operated at lower centrifugal forces or applied filtration pressure versus typical low speed centrifugation or 0.8 µm diameter pore polymer filters, potentially reducing the extent to which EVs are entrapped in aggregated matrix species. Such entrapment is a consequence of aggregate formation during centrifugation or filtration. With respect to 0.8 µm diameter pore polymer filters, such aggregate formation is often a consequence of these filters tortuous path membranes and ≥10 µm thickness (resulting in high permeation resistance). Therefore, in none of the embodiments does the present disclosure use 0.8 µm diameter pore polymer filters that are microns-thick. In one example, a preferred MS SiN membrane (0.5 µm microslit width, 50 µm microslit length, 400 nm thickness) can pre-filter 500 µL of urine in 5 minutes at 600 g and remove four-times more total urinary protein versus a 2,000 g centrifugation for 30 minutes.

The pre-filtration membrane 205 forms a first filtrate 120 and a first retentate 125. The first filtrate 120 may comprise a fluidic fraction derived from the biofluid sample 100, and throughout this disclosure, this first filtrate 120 (i.e., fluidic fraction) may be referred to as the derived or resultant flow-through volume (FTV) from the pre-filtration membrane 205. This first filtrate 120 (i.e., flow-through volume) likely contains the desired EVs, as well as other incidentally permeating species. The first retentate 125 may comprise matrix species that are retained by the pre-filtration membrane 205 (e.g., intact cells, cellular debris, and/or large proteins), and throughout this disclosure, are generally regarded as unwanted. Such matrix species may become aggregated on the contacting surface (i.e., cis-side 205a) of the pre-filtration membrane 205. The first filtrate 120 (i.e., flow-through volume) permeates through the pre-filtration membrane 205 and thus is in fluid contact with the trans-side 205b of such membranes.

The first retentate 125 may potentially entrap desired EVs. An optional washing step may be used to dislodge entrapped EVs in the aggregated first retentate 125 that remains on the cis-side 205a of the pre-filtration membrane 205. The incubation time, salt, pH, temperature, and composition of the washing solution 110 may be specified in order to promote the release of any entrapped EVs. For example, EVs may become entrapped within first retentate 125 aggregates of Tamm-Horsfall protein when the biofluid sample 100 is urine and those skilled in the related art will recognize that increased pH (pH 8.5-9.5), chelating agents (e.g., ethylene diamine tetra-ascetic acid), reducing agents (e.g., beta-mercaptoethanol or dithiothreitol), and/or detergents (e.g., sodium dodecyl sulfate or Tween 20), as well as various combinations of the foregoing, may be used to promote the release of entrapped EVs from Tamm-Horsfall protein first retentate 125 aggregates. Of course, similar or different wash solution 110 constituents may be used for the release of entrapped EVs from first retentates 125 of other types of biofluid samples 100.

The biofluid sample 100 may be optionally diluted prior to contact with the pre-filtration membrane 205. Such dilution may be used to improve the permeation of the flow-through volume 120 and/or to reduce the extent to which first retentate 125 aggregates form on the trans-side 205b of the pre-filtration membrane 205. The dilution may comprise addition of a solution (e.g., buffer) suitable for the nature and composition of the biofluid sample 100. For example, the biofluid sample 100 may be whole blood and the dilutant may be phosphate-buffered saline (PBS). In another embodiment, the biofluid sample 100 may be urine and the dilutant is a solution with specified concentrations of buffering, reducing and chelating agents, such that Tamm-Horsfall protein filaments are disrupted. The dilution factor may be 1-times to 20-times the initial volume of biofluid sample 100, including all integer volume values and ranges therebetween.

In examples of the methods disclosed herein, the pre-filtration membrane 205 forms a first filtrate 120 (e.g., flow-through volume) that is passed to the capture membrane 210 for subsequent contact with the capture membrane 210 for EV isolation. Such isolation may comprise EV capture in the second retentate 135 on the cis-side 210*a* of the capture membrane 210, optional washing of retained EVs in the second retentate 135, elution and transfer of isolated EVs 105, or alternatively, lysing the EVs while they are retained on the capture membrane 210 so that their internal contents can be recovered and purified, thereby provided recovered or eluted EVs.

The contact of the first filtrate 120 with the capture membrane 210 forms a second filtrate 130 and a second retentate 135. The second filtrate 130 may comprise unwanted species that permeate through the capture membrane 210. The second retentate 135 may comprise captured (i.e., retained) EVs. Thus, contact of the first filtrate 120 with the capture membrane 210 filters EVs from the other species that co-permeated the pre-filtration membrane 205. The cis-side 210*a* of the capture membrane 210 contacts the first filtrate 120 (e.i. flow-through volume) from the pre-filtration membrane 205, thereby forming a second retentate 135 of captured EVs and other incidental species and a second filtrate 130 of liquid and other incidental species that permeate through the openings of the capture membrane 210.

The capture membrane 210 retains EVs by a size-dependent filtration mechanism, wherein EVs are generally equal to, or larger than, the diameter of the pores of a capture membrane 210, and are retained by such membranes. Species in size that are less than the diameter of pores of a capture membrane 210 permeate through the capture membrane (e.g. molecules with an effective hydrodynamic diameter that are less than the pores' diameter). The capture mechanism is not by means of an affinity capture mechanism (e.g., polar-polar, non-polar-non-polar, charge-charge, or receptor-ligand-like interactions between EVs and affinity membranes), rather the capture mechanism is a size-dependent filtration mechanism as described above.

The capture membranes may comprise a nanoporous silicon nitride membrane. In various examples, the capture membranes may comprise a nanopore diameter of 10 nm to 300 nm, including all integer nm values and ranges therebetween. In various examples, the capture membranes may comprise a thickness of 50 nm to 300 nm, including all integer nm values and ranges therebetween. In one example, the capture membrane comprises a thickness of 200 nm silicon nitride and a pore diameter of 275 nm. In another example, the capture membrane comprises 100 nm thick nanoporous silicon nitride(NPN) with an average pore diameter of 50 nm.

Two capture membranes 210 with different pore sizes may be used to differentiate microvesicles from exosomes within the same biofluid sample 100 by a size-dependent mechanism. In another embodiment, a first nanoporous membrane (i.e., a first capture membrane 210) with 200 nm to 300 nm diameter pores (including all integer nm values and ranges therebetween) may be used to capture microvesicles. The contact of the pre-filtration membrane's first filtrate 120 with the first nanoporous membrane 210 retains microvesicles whose diameter is equal to (and greater than) the pore diameter of the first nanoporous membrane 210, wherein the microvesicles are retained on the membrane's cis-side 210*a* in the second retentate 135. Other EVs (e.g., exosomes) whose diameter is less than the pore diameter of the first nanoporous membrane 210 permeate to the membrane's trans-side 210*b*. Such permeated exosomes in the second filtrate 130 may be subsequently retained by a second nanoporous membrane (i.e., a second capture membrane 215) as similarly disclosed herein. For example, the exosomes may be retained by a second nanoporous membrane 215 comprising a pore diameter of 30 nm to 100 nm (including all integer nm values and ranges therebetween), wherein exosomes whose diameter is equal to (or greater than) the pore diameter of the second nanoporous membrane 215 are retained on the cis-side 215*a* of such a membrane in a third retentate 145. The second nonporous membrane 215 also creates a third filtrate 140. In these examples, the pore diameter of the first and second capture membranes, 210 and 215 respectively, may be specified in order to accomplish the desired outcome (i.e., retention and permeation of certain EV size populations). Other incidental species may be retained and/or permeated by the two capture membranes used in such examples.

The capture membrane 210 (and in some embodiments 215) of the present invention offers several advantages over other methods; with particular advantages over affinity membrane EV isolation methods. For example, the extent of retention of EVs on nanomembranes can be greater than that retained by affinity membranes (e.g., one or more 1 μm to 3 μm diameter pore polymer membranes that are positively charged and that further act as anion exchangers. Such charged membranes are intended to improve the extent of EV-membrane capture efficiency, since EVs are generally considered to carry a net negative charge, owing to their phosphotidylserine content within the outer leaflet of their lipid bilayer. The capture membrane 210 (and in some embodiments 215) can be operated at low centrifugal forces or applied pressure, potentially reducing the extent to which EVs can be subsequently eluted from capture membranes. As another example, EVs captured by a size-dependent mechanism captures all EVs that are equal to, or larger than, the diameter of the capture membrane's 210 pores, potentially leading to higher capture efficiency. By contrast, positively charged membranes with micron-diameter pores rely on EV-membrane interactions for capture, which may be low as to extent and thus important molecular information is lost as fewer EVs are captured. The latter is particularly important because nucleic acid contents of EVs bearing aberration or mutations that may be indicative of a disease circulate in very low abundance. Additionally, polymer membranes that are typically 10 μm thick have tortuous paths and high permeability resistance, both of which reduce the efficiency at which EVs can be eluted and recovered from such polymer membranes. Such tortuous path membranes are known to have a large internal surface area as well, potentially increasing the surfaces on which EVs could be denatured and/or lysed. Therefore, the present disclosure does not use positively or negatively charged polymer membranes that are microns-thick.

Optionally, a wash step may follow after the contact with the pre-filtration 205 and/or capture membranes 210, 215. Such wash step may release trapped EVs in the first retentate 125 that have been retained in matrix components and/or liberate non-specifically retained or bound species. Any such washing steps may form a washed filtrate 120*a* that could be collected or discarded. Any washing steps may use a wash solution (e.g. buffer) 110 and may include re-suspension and/or re-filtration and may further comprise any of the flow modalities disclosed herein. The wash solution 110 may have specified pH, salt, detergent, chelating, or other agents for improving the extent to which non-specifically bound species are released and/or to reduce the extent of EV entrapment. Accordingly, a kit of the present disclosure may comprise reagents and solutions for such washing.

The elution step may comprise releasing first captured EVs 136 in the second retentate 135 by several means. In a preferred example, a bolus of solution 300 (e.g., buffer) could be introduced from the trans-side 210*b* of the capture membrane 210 and flowed to its cis-side 210a, thereby reversing the flow modality initially used to capture the EVs on the cis-side 210a of the capture membrane 210. This introduction of solution 300 forces the first captured EVs 136 off the cis-side 210a of the capture membrane 210. The released or eluted EVs 138 could then be collected and transferred. The collection and/or transfer may comprise any of the flow modalities disclosed herein for contact with membranes, washing, and/or eluting. In another embodiment, an elution solution 300 (e.g. a buffer) may be introduced to the cis-side 210a of the capture membrane 210 on which the first captured EVs 136 have been retained in second retentate 135 and then the elution solution 300 cycled by automated or manual pipette to re-suspend the first captured EVs 136. The first re-suspended EV solution 136a could then be drawn off, collected, and/or transferred. By collected and/or transferred, it is meant that the first re-suspended EVs 136a or eluted EVs 138 are handled by fluidic means such that they can be disposed in, for example, other fluidic devices, instrumentation, or storage vessels 310. The elution solution 300 may have specified pH, salt, detergent or other agents for improving the extent to which first captured EVs 136 are re-suspended and released. Accordingly, a kit of the present disclosure may comprise reagents and elution solutions 300 for such elution.

Alternatively, a lysing step may be used instead of an elution step. Such lysis may be used to disrupt first captured EVs 136 so that their molecular contents can be recovered and subsequently purified. For example, a lysis solution 320 comprising an organic solvent (e.g. phenol) and a chaotrope (e.g. guanidinium hydrochloride) may be used for lysing first captured EVs 136 while they remain on the capture membrane 210. A lysis filtrate 150 can then be recovered from this lysis solution 320, to which a phase separation agent 155 (e.g. chloroform) may be added in order to generate an aqueous phase 165 and an organic phase 160, and subsequent processing carried out for purifying RNA 170 from the aqueous phase 160. Such a lysis solution 320 will be recognized by those skilled in the related art as a well-known method for RNA isolation. As another example, a lysis solution 320 comprising a buffer or detergent (e.g. NP40 or Triton X100) may be used for lysing first captured EVs 136 while they remain on the capture membrane 210. A lysis filtrate 150 can then be recovered from this lysis solution 320, wherein the lysis filtrate 150 comprises solubilized proteins from the EVs. Such a lysis solution 320 will be recognized by those skilled in the related art as a well-known method for protein recovery. Accordingly, a kit of the present disclosure may comprise reagents and lysis solutions 320 for such lysing steps.

The eluted and/or lysed EVs (released EVs 138 or lysis filtrate 150) may be useful for a variety of biomedical purposes as assessed by any one of a number of analytical assays. For example, such EVs could be used in an analytical method for determining a disease prognosis or diagnosis. Alternatively, such EVs could be used for a laboratory or clinical research test, such as delivery of pharmacological agents or biomolecules to an animal or a cell culture, or the EVs could be analyzed by one of many possible analytical methodologies for protein, nucleic acid, metabolite or other constituents. As another example, the EVs could be analyzed as part of a quality control test for a biomanufacturing procedure, wherein EVs are produced for therapeutic purposes. In various examples, the methods, devices and kits of the present invention are used to carry out an assay on isolated EVs 105 from biofluid samples 100 from a subject (e.g., animals, including humans) in order to carry out any of the foregoing uses of EVs.

The devices, methods, and kits of the disclosure are suitable for use with biofluid samples 100 derived from a human subject. The devices, methods, and kits of the disclosure are also suitable for use with biofluid samples 100 derived from a non-human subject such as, for example, a rodent, a non-human primate, a companion animal (e.g., cat, dog, horse), and/or a farm animal (e.g., chicken or cow).

In further examples, the devices, methods and kits disclosed herein provide for the recovery and purification of nucleic acids from EVs. Preferably, such nucleic acids are DNA and/or DNA and RNA and may comprise messenger RNA, ribosomal RNA, transfer RNA, or small RNAs such as microRNAs, or any combination thereof. The nucleic acids may be single-stranded or double-stranded. An internal control (e.g., known amount of pre-determined sequence) may be added to the lysate solution as a measure of processing efficiency. Various nucleic acid sequencing techniques may be used to detect and analyze such nucleic acids recovered and purified from the isolated EVs 105 from biofluid samples 100. Analysis of nucleic acids for diagnostic purposes has wide-ranging implications due to the non-invasive nature in which EVs can be isolated. For example, use of EV analysis (e.g., sequencing for aberrations, mutations, methylation and the like) in place of invasive tissue biopsies could positively impact patient welfare, improve the ability to conduct longitudinal disease monitoring, and improve the ability to obtain expression profiles even when tissue samples are not easily accessible (e.g., in ovarian or brain cancer patients).

The eluted and/or lysed EVs 138 may be assessed by a variety of analytical assays well-known to those skilled in the related art and could include a sequencing reaction, an amplification reaction, polymerase chain reaction, reverse transcriptase-polymerase chain reaction, ligase chain reaction, Northern blotting, Southern blotting, fluorescent hybridization, enzymatic treatment, enzyme-linked immunoassay, immunoprecipitation, Western blotting, fluorescence-activated sorting, optical imaging, electron microscopy, surface plasmon resonance, Raman spectroscopy, mass spectroscopy, or interferometry, among other possibilities. In some examples, the assay can be nanopore-based resistive pulse sensing; for example, as disclosed in Huff et al (WO #2016161402A1). In other examples, the assay can be arrayed imaging reflectometry (for example, as disclosed in Miller and Rothberg, U.S. Pat. No. 7,292,349). Any such analytical assays may be multiplexed to assess the EVs for more than one or more molecular constituent. Of course, other possibilities exist and these examples have been provided merely for exemplary purposes.

In various embodiments, the present disclosure also provides devices for carrying out the methods of the invention. Such devices may include fluidic devices, device components, or any combinations thereof.

In various examples, the devices may comprise fluidic devices 10 incorporating silicon nanomembranes of the present disclosure. The fluidic devices may comprise a microfluidic device 15, a filtration column 20, or a stirred cell 25. Such fluidic devices may incorporate one or more pre-filtration membrane 205 and one or more capture membrane 210. The fluidic devices 10 may be formatted as stand-alone units that are used in combination with a centrifuge or pump, in combination with other device components, for carrying out the methods of the present disclosure. The fluidic devices 10 may be formatted as one-time-use consumables. Accordingly, devices and kits of the present invention may comprise one or more fluidic device 10.

In various examples, the fluidic devices 10 may comprise a range of configurations to carry out the methods of the present disclosure. For example, a pre-filtration membrane 205 may be configured fluidically upstream from a capture membrane 210, such that the first filtrate 120 (from the pre-filtration membrane (i.e., flow-through volume) is passed to the capture membrane 210. In another example, a pre-filtration membrane 205 is configured fluidically upstream from a first capture membrane 210, wherein the first capture membrane 210 is also configured fluidically upstream from a second capture membrane 215, such that the first filtrate 120 (i.e., flow-through volume) from the pre-filtration membrane 205 is passed to the first capture membrane 210 and a second filtrate 130 from the first capture membrane 210 is passed to the second capture membrane 215. The fluidic devices 10 may comprise configurations with one or more fluidic chambers 30 that are in fluidic contact with cis- and trans-sides of pre-filtration and/or capture membranes (205a, 205b, 210a, 210b, 215a, 215b). The fluidic chambers 30 are fluidically connected via the plurality of openings 410 (e.g., micropores, microslit and/or nanopores) of the various membranes. Each of the various fluidic chambers 30 may comprise configurations with one or more inlets and outlets. Accordingly, devices and kits of the present invention may comprise one or more fluidic devices 10 with some or all of the foregoing configurations or any combinations thereof.

The contact with the membranes of the fluidic devices may comprise a multitude of flow modalities, including normal flow, tangential flow, and combinations thereof. Normal (or dead-end) flow comprises flow that is perpendicular to the surface of the membrane, while tangential flow comprises flow that is parallel to the surface of the membrane. In various examples, the contact with membranes may comprise normal flow, tangential flow, or combinations thereof. The washing, elution and/or lysing steps may comprise normal flow, tangential flow, or combinations thereof. The elution may further comprise reversing the flow modality initially used for EV capture, wherein such reversal elutes EVs from the capture membrane.

A combination of both normal and tangential flow may be recognized by those skilled in the related art as diafiltration, wherein there is a net (normal) transmembrane flow vector in addition to a tangential flow vector for both cis- and trans-side contacting fluids. Accordingly, contact with the pre-filtration membrane 205, as well as the washing, eluting and/or lysing steps, may further comprise diafiltration. In a further example, contact of the biofluid sample 100 with the pre-filtration membrane 205 may comprise diafiltration and contact with the resultant first filtrate 120 with the capture membrane 210 may comprise normal flow. In another example, contact of the biofluid sample 100 with the pre-filtration membrane 205 and contact of the resultant first filtrate 120 with the capture membrane 205 both comprise normal flow. It is noted that, in none of the embodiments disclosed herein does the contact of the pre-filtration membrane 205-derived first filtrate 120 with the capture membrane 210 comprise tangential flow nor diafiltration.

Normal and/or tangential flow could be accomplished by multiple methods. For example, such flow may comprise centrifugation, pumping, vacuum, positive pressure, negative pressure, gravity flow, gas pressurization, hydrostatic pressure, and the like. In various examples, the centripetal force used may comprise 100 g to 2,000 g, including all integer g values and ranges therebetween. In various examples, the applied pressure used may comprise 6.9 kPa to 206.8 kPa, including all integer kPa values and ranges therebetween. The pre-filtration membrane 205 and capture membranes 210, 215 of the present disclosure have a specified thickness so that the contact and filtration operates at a range of low pressurization when performing such steps.

In other embodiments, the fluidic device 10 may comprise a microfluidic device 15, wherein such microfluidic devices 15 may comprise one or more pre-filtration membrane 205 and one or more capture membrane 210, 215, having at least one fluidic chamber 400 or channel in fluidic contact with the cis-side 205a of a pre-filtration membrane 205 and at least one fluidic chamber 405 or channel in fluidic contact with the trans-side 205b of the pre-filtration membrane 205 and the cis-side 210a of a capture membrane 210. The cis and trans-sides 205a, 205b of the pre-filtration membrane 205 oppose each other and their respective cis- and trans-side chambers 400, 405 or channels and are fluidically connected by a plurality of openings 410 in the pre-filtration membrane 205. The cis-side 210a of the capture membrane 210 is in fluidic contact with the trans-side 205b of the pre-filtration membrane 205 by virtue of its connection with the trans-side 205b fluidic channel 405 or chamber of the pre-filtration membrane 205. In one example, the pre-filtration membrane 205 is configured fluidically upstream of the capture membrane 210 such that the membranes are of different fluidic planes. In one example, the two membranes are incorporated into one fluidic device 10, while in another example, the two membranes are incorporated into individual fluidic devices (not shown) such that the outlet of the pre-filtration membrane fluidic device is fluidically connected to the capture membrane fluidic device. The foregoing examples may also exemplify configurations comprising fluidic devices with a pre-filtration membrane, a first capture membrane, and a second capture membrane.

In further embodiments, the fluidic device 10 may comprise a stirred cell 25 with one or more means for disrupting caking or fouling layers that may form during contact with the membranes (e.g., micro-flea magnetic stirrers or magnetic flagella). Such stirred cells 25 may comprise one or more pre-filtration membrane 205 and one or more capture membrane 210, having at least one fluidic chamber 400 or channel in fluidic contact with the cis-side 205a of a pre-filtration membrane 205 and at least one fluidic chamber 405 or channel in fluidic contact with the trans-side 205b of the pre-filtration membrane 205 and the cis-side 210a of a capture membrane 210. The cis and trans-sides 205a, 205b of the pre-filtration membrane 205 oppose each other and their respective cis-side and trans-side chambers 400, 405 or channels are in fluid communication by a plurality of openings 410 in the pre-filtration membrane 205. The cis-side 210a of the capture membrane 210 has a fluidic chamber 420 that is in fluidic contact with the trans-side 205b of the pre-filtration membrane 205 by virtue of its connection with the trans-side fluidic channel 405 or chamber of the pre-filtration membrane 205. In one example, the pre-filtration membrane 205 is configured fluidically upstream of the capture membrane 210 such that the membranes are of different fluidic planes. In one embodiment, the two membranes are incorporated into one fluidic device 10, while in another example, the two membranes are incorporated into individual fluidic devices (not shown) such that the outlet of the pre-filtration membrane 205 fluidic device is fluidically connected to the capture membrane fluidic device. The foregoing examples may also exemplify configurations comprising fluidic devices 10 with a pre-filtration membrane 205, a first capture membrane 210, and a second capture membrane 215.

In yet other embodiments, the fluidic device 10 may comprise a filtration column 20 configured for use in a centrifuge. Those skilled in the related art may recognize this configuration as a spin column, wherein the fluidic device 10 is routinely inserted into a centrifuge tube during use. Alternatively, the centrifuge tube can be replaced by an adapter to a vacuum manifold for similar use. Such filtration columns may comprise, for example, one filtration column with a pre-filtration membrane and one filtration column with a capture membrane, wherein the membrane of either filtration column comprises one chamber in fluidic contact with the cis-side of the membrane and one chamber in fluidic contact with the trans-side of the membrane. The cis and trans-sides of the membranes oppose each other and their respective cis-side and trans-side chambers are fluidically connected by a plurality of openings 410 in the membranes. In one example, the pre-filtration membrane is configured fluidically upstream of the capture membrane such that the membranes are of different fluidic planes, and in this example, the two membranes may be incorporated into one fluidic device. In a preferred example, the two membranes are incorporated into individual fluidic devices, and in this example, the biofluid sample would be initially filtered by a first fluidic device incorporating a pre-filtration membrane, the filtrate (i.e., flow-through volume) from this first fluidic device transferred to a second fluidic device incorporating a capture membrane, and microvesicles isolated by the second fluidic device. A third fluidic device incorporating a capture membrane could also be used to isolate exosomes from the filtrate of the second fluidic device.

The pre-filtration membrane 205 and capture membranes 210, 215 of the fluidic devices 10 comprise porous materials that can be fabricated by various methods. For example, microporous, microslit and nanoporous membranes may comprise a suspended membrane layer that was fabricated by patterning and etching the openings into silicon nitride or other Si-based film, using well-known patterning methods and reactive ion etching, followed by bulk substrate etching to suspend the silicon nitride or other Si-based film by etching through a substrate (e.g., a silicon wafer). Examples of microporous (MP SiN) membranes with 0.5 μm to 8 μm diameter pores and the fabrication of such membranes are known to those skilled in the related art, wherein micropores can be patterned and etched using I-line photolithography and reactive ion etching, respectively. Examples of microslit (MS SiN) membranes and the fabrication of such membranes are disclosed in Roussie et al (WO 2019/036545), the disclosure of which with regard to MS SiN membranes is incorporated herein by way of reference. Examples of nanoporous silicon nitride (NPN) membranes with 10 nm to 80 nm diameter pores and the fabrication of such membranes are disclosed in Striemer and DesOrmeaux (U.S. Pat. Nos. 9,789,239 and 10,391,219), the disclosure of which with regard to NPN membranes is incorporated herein by way of reference. Examples of other nanoporous membranes with 100 nm to 30 nm diameter pores and the fabrication of such membranes are known to those skilled in the related art, wherein nanopores can be patterned and etched using deep ultraviolet photolithography and reactive ion etching, respectively. Of course, other microslit filter materials and fabrication methods are possible and these examples have been provided merely for exemplary purposes.

Pre-filtration membranes 205 and capture membranes 210, 215 are incorporated into fluidic devices 10 as independent or combined elements for carrying out the methods of the disclosure. For example, one or more pre-filtration and capture membranes, each comprising a suspended silicon nitride membrane on a silicon substrate, can be fabricated using a Si wafer and the resultant membranes incorporated into a fluidic device. The suspended silicon nitride membranes correspond to freestanding regions wherein the plurality of openings 410 through the membranes (e.g., micropore, microslit or nanopore) fluidically connect cis-side and trans-sides of the membranes.

The membranes may be functionalized with non-fouling surface treatments. Both the pre-filtration membrane 205 and capture membranes 210, 215 of the fluidic devices 10 may be functionalized for purposes of reducing non-specific binding of biofluid species and/or improving elution. Such functionalized nanomembranes are not functionalized for purposes of promoting EV-capture membrane interactions (i.e. not for purposes of affinity EV capture). As examples, the pre-filtration and capture membranes can be functionalized with moieties that decrease the adhesion to biofluid sample 100 species (e.g. coatings to reduce or prevent fouling). A silanization process could be used for membrane functionalization, wherein a vapor phase silane source contacts the membranes, the silane reacts with a functional surface group of the membranes, and the silane is further derivitized with a poly-ethylene glycol moiety of 5-10 carbon atoms in length. as another example, membranes could be functionalized with a carbinylation process as disclosed in Shestopalov et al (U.S. Pat. No. 9,899,212), which is hereby incorporated by way of reference, wherein a vapor phase carbine source (e.g., a diazirine compound) contacts the membranes, the carbine reacts with a functional surface group of the membranes (e.g., an aliphatic monolayer), and the carbine is further derivitized with a poly-ethylene glycol moiety of 5-10 carbon atoms in length. In a further example, membranes could be functionalized using an epihalohydrin-based process as disclosed in Carter and Roussie (WO 2019/136398 A1) which is hereby incorporated by way of reference, wherein membranes are chemically treated, reacted with gas-phase epichlorohydrin, and then terminally reacted with an amine-containing reactant (e.g., amino-PEG or ethanolamine). In these examples, terminal surface hydroxyl groups provide a non-fouling surface (e.g., a non-fouling surface treatment).

In further embodiments, the devices may further comprise one or more fluidic devices.

In further embodiments, the devices may further comprise various components, wherein such device components may include receptacles and connectors for pre-filtering and capture membrane one-time-use consumables, pumps, valves, flow controllers, pressure sensors, flow sensors, magnetic stirrers, software, touch screen or buttons for operation, a display for operational outputs, a power supply, and the like, or any combinations thereof. Of course, other device elements are possible and the examples have been provided for exemplary purposes.

In various embodiments, the present invention further provides kits that may include devices, reagents, solutions, and instructions for carrying out the methods.

In various embodiments, the kits may comprise one or more of any of the fluidic devices disclosed herein.

In various embodiments, the kits may further comprise reagents and solutions for any of the diluting, washing, eluting, and/or lysing steps.

In various embodiments, the kits may further comprise one or more of any of the device components disclosed herein, or any combination of such device components.

In various embodiments, the kits may further comprise instructions for carrying out any one of the methods disclosed herein.

EXAMPLES

The following examples describe various embodiments of the methods and devices of the present disclosure, and therefore, are intended to illustrate possible embodiments disclosed herein. The examples are not intended to be limiting in any matter.

Example 1

This example provides a fluidic device and a method of use thereof.

FIG. 1 depicts in (A) the sample processing workflow enabled by nanomembrane fluidic devices (i.e. filtration columns), hereinafter referred to as Spin Column Devices and/or SepCon™ devices or SepCon™ spin columns in (B) a representative, fully assembled device incorporating a nanomembrane (C) the SepCon™ device as installed in a standard 2.0 mL capacity microcentrifuge tube. SepCon™ is a registered mark of SIMPORE Inc.

Example 2

This example provides an EV isolation workflow using pre-filtration and capture membranes and a representative biofluid sample.

Figure 2B:
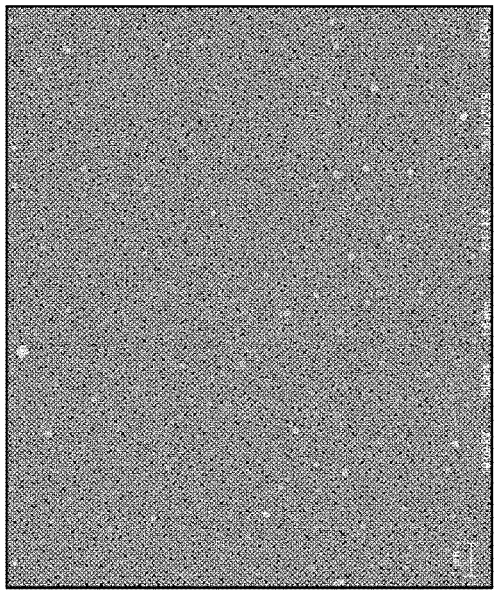
FIG. 2B depicts a scanning electron microscope image of a capture membrane filter after filtering.
Figure 2C:
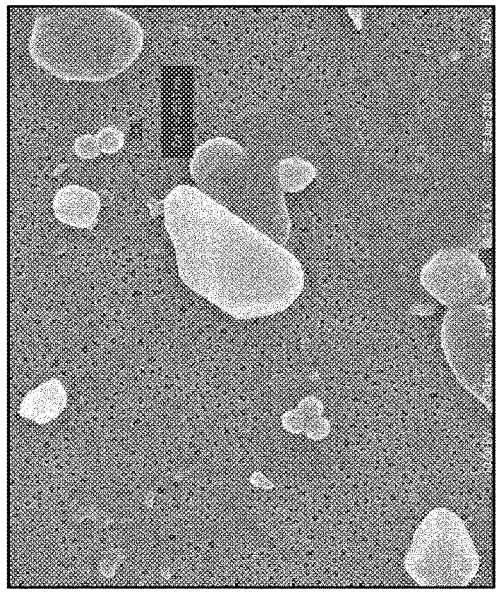
FIG. 2C depicts a 9× magnified scanning electron microscope image of FIG. 2B.
Figure 2A:
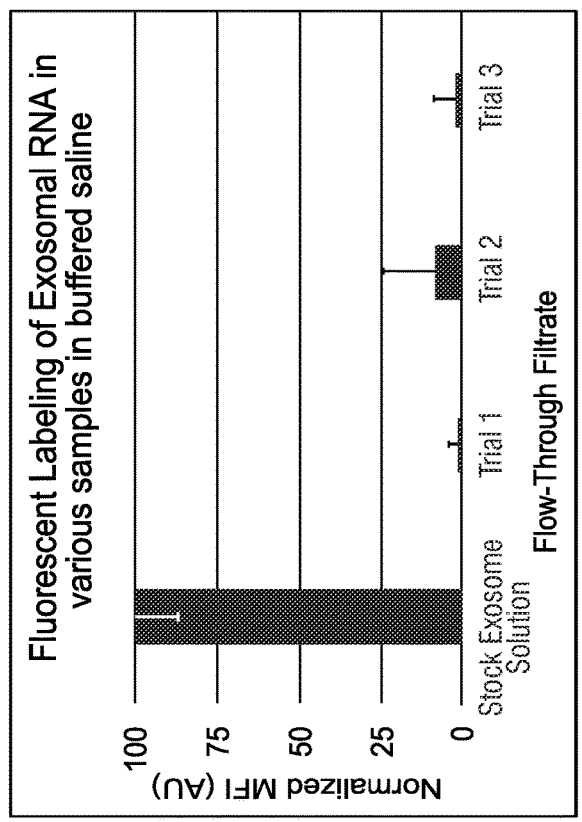
FIG. 2A depicts a representative isolation of EVs using capture membranes of the present disclosure.

FIG. 2A depicts fluorescent labeling of EVs in phosphate buffered saline (PBS) stock solution ($1\times10^6$ EVs/mL, pooled human urine origin purified by differential ultracentrifugation, orange bar) and in the filtrate after contact with a capture membrane (nanoporous silicon nitride (NPN) membrane with 100 nm thickness and average pore diameter of 50 nm) installed in SepCon™ devices (n=3 devices per trial, 500 µL starting volume, blue series). FIG. 2B is a Scanning Electron Microscopy generated image of a membrane filter surface after filtering as described in FIG. 2A showing EVs as white spheres decorating the membrane surface. FIG. 2C is a magnified (19.21 kx) image of the membrane shown in FIG. 2B at 6.4 kx magnification. EVs were stained with Syto Green™ dye (Thermo Fisher) to label RNA, following manufacturer's recommended protocol.

Figure 3:
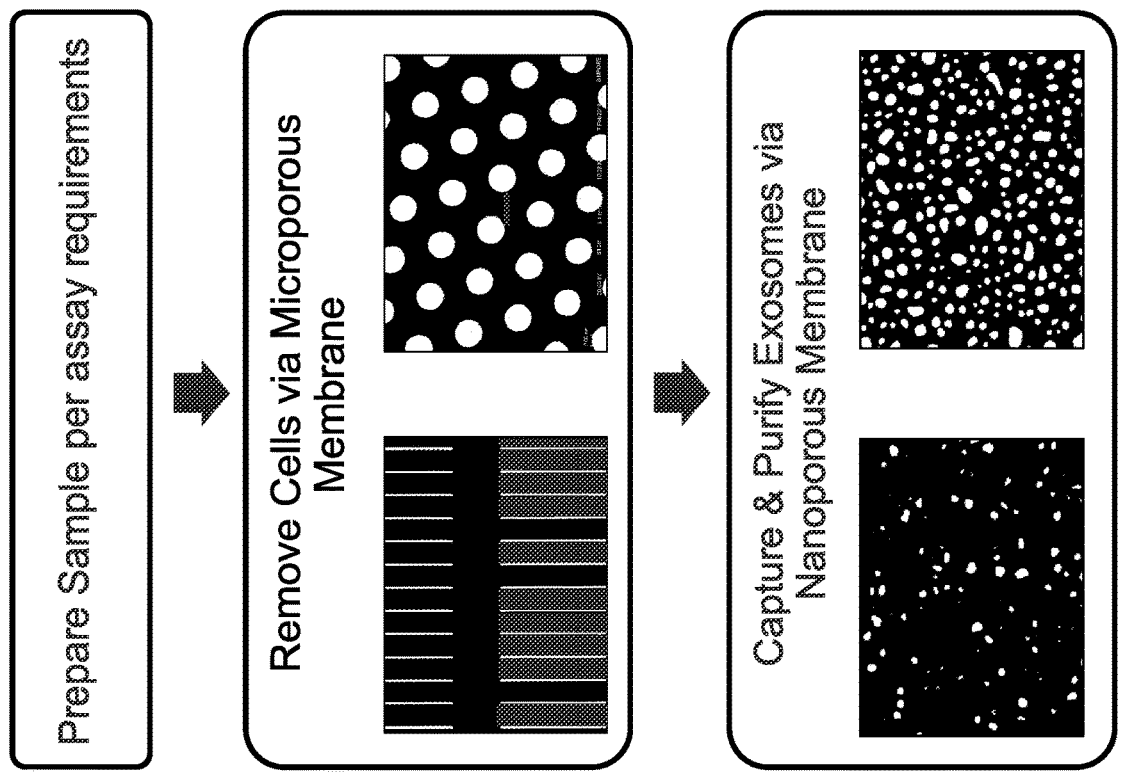
FIG. 3 depicts a process for pre-filtering biofluid samples using pre-filtration membranes of the present disclosure.

FIG. 3 depicts a sample processing workflow for EV preparation from raw biofluids, where the biofluid is first pre-filtered with a SepCon™ device installed with either a microporous or microslit silicon nitride pre-filtration membrane (representative electron micrographs shown). The filtrate (i.e. flow-through volume, FTV) from the foregoing was passed to a NPN membrane SepCon™ device to capture EVs and to remove smaller contaminant species (e.g. proteins, metabolites, etc.)

Figure 4B:
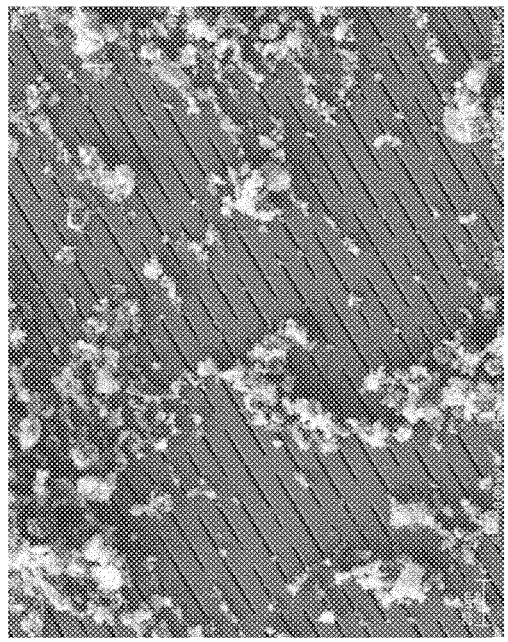
FIGS. 4A-4D depict removal of unwanted matrix species of biofluid samples using pre-filtration membranes of the present disclosure.
Figure 4D:
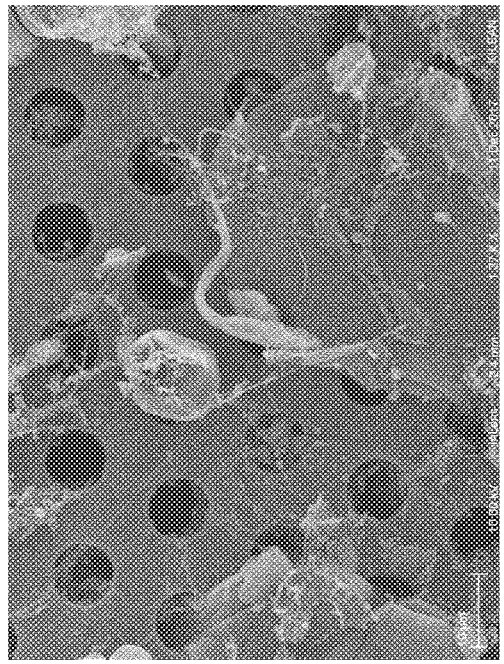
Figure 4A:
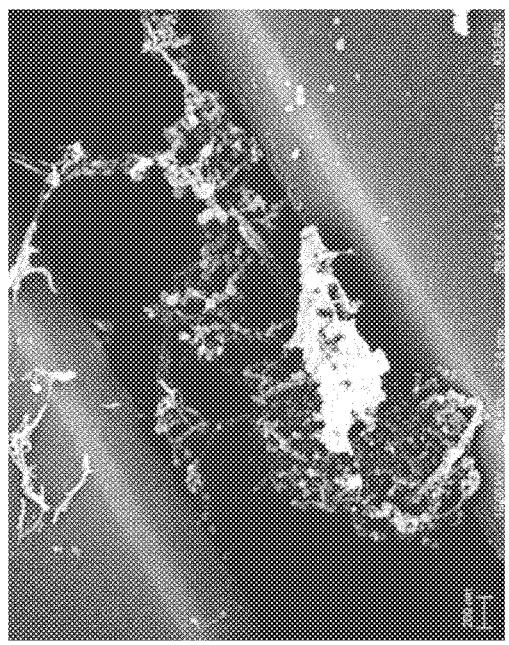
Figure 4C:
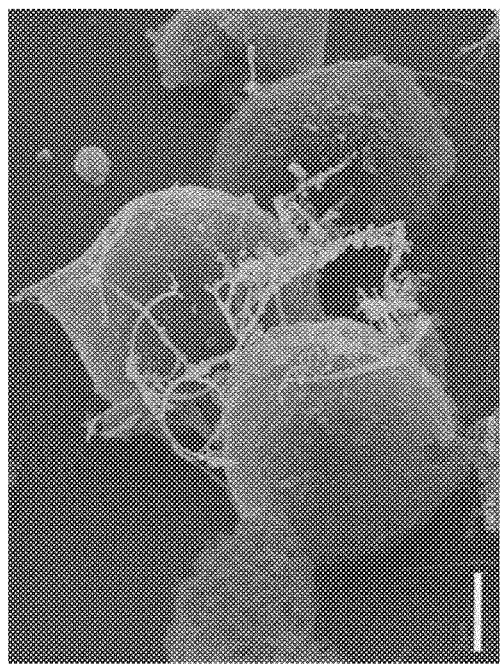
Figure 4G:
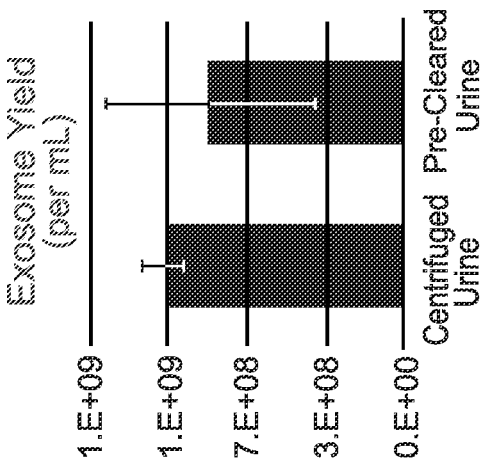
FIGS. 4E-4G depict cell counts at various stages of the process.
Figure 4F:
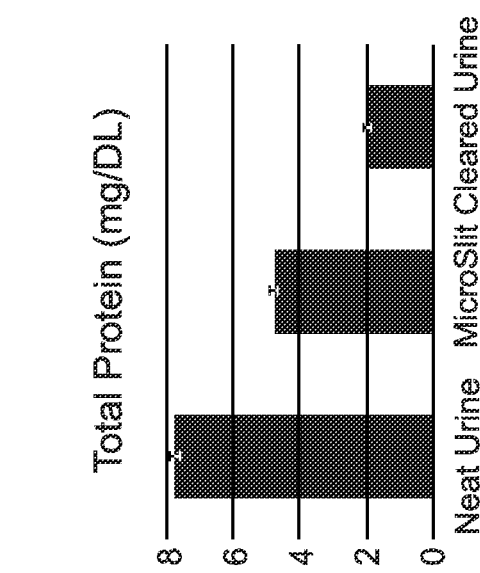
Figure 4E:
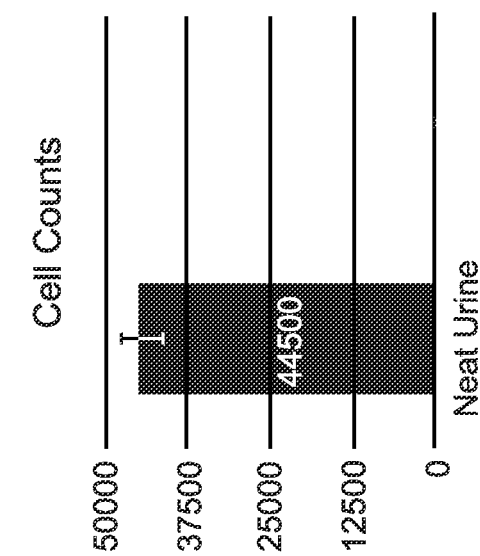

FIGS. 4A-4D depicts that pre-filtration with microslit membranes of human urine, results in effective pre-clearance to reduce contaminant species. In FIGS. 4A and 4B microslit filters used in the SepCon™ device are effective at retaining cells, cell debris, and Tamm-Horsfall protein (THP) endogenous to urine. The images of FIGS. 4A and 4B show such membranes after filtration of 500 µL of raw untreated human urine in a SepCon™ device followed by SEM. FIGS. 4C and 4D are images that demonstrate that microporous filters have similar retention efficiency of matrix species as shown by SEM of membranes after filtering 500 µL of human urine. FIG. 4E depicts cell counts obtained via hemocytometer with methylene blue dye exclusion for n=3 samples before and after passage through the microslit filter. FIG. 4F illustrates the total protein in raw untreated urine, after low speed centrifugation (2,000 g spin for 30 minutes at 4° C.) and after microslit filtration. Results indicate microslit filters remove ~75% of THP from urine samples as assayed via the OPA total protein technique. FIG. 4G illustrates, importantly, the exosome concentration of raw urine and the microslit membrane-derived flow-through volume (FTV) remains generally equivalent (~20% reduction due to the 2-step filtration process) as measured by an exosome sedimentation and fluorescent staining RNA assay.

FIGS. 5A-5C demonstrate that a high percentage of EVs in human urine are captured by NPN membranes. FIG. 5A depicts the results of fluorescent RNA labeling of EVs in human urine pre-filtered by microslit membranes (as the starting stock solution), the filtrate of this solution using NPN membranes, and a negative control solution (filtrate from a urine sample passed through 2 MDa dialysis membrane as a EV-free negative matrix control). FIG. 5B depicts the results of immunolabeling by dot-blot of a characteristic EV surface protein (CD-63) of the samples assayed in FIG. 5A and shows that surface protein relative abundance correlates well to RNA labeling. A standard dilution series control using commercially-sourced urinary EVs (Hansa) assayed in parallel yields the expected concentration of the microslit membrane pre-filtered stock solution($1\times10^9$ EVs/mL) and low abundance in the filtrate after contact with NPN membranes(~$1\times10^8$ EVs/mL). In FIG. 5C, the results of evaluation of the microslit membrane pre-filtered urine via dynamic light scatter (DLS) analysis demonstrates a broad particle distribution in the sample, of which ~8% would be expected to permeate through the NPN membranes due to relative particle versus pore diameter sizes.

Example 3

This example provides methods of eluting (i.e., recovering) EVs from capture membranes.

FIGS. 6A-6C depict a workflow development for EV recovery from nanomembrane SepCon™ devices. FIG. 6A is a graphic representation of EV separation from other species via centrifugal spin column enabled by Nanomembranes. EVs (solid spheres) are captured onto the cis-side of the membrane, while smaller species (dotted spheres) pass through the membrane and are collected in the microcentrifuge tube. Following separation, EVs may be recovered from the device by two practical methods, described here graphically. FIG. 6B shows that method 1 required the addition of elution buffer to the SepCon™ device tube, followed by manual pipet aspiration to dislodge and elute EVs from the membrane. FIG. 6C shows method 2, performed recovery via hydraulic dislocation of the EVs via passing buffer from the trans-side to the cis-side of the capture membrane by centrifugation. In both methods tested, the elution buffer is phosphate-buffered saline supplemented with 5 mM EDTA and 0.05% BRIJ-35

FIGS. 7A-7D depict verification of EV release from the Nanomembrane surface after elution. FIGS. 7A and 7B are SEM images that were collected before and after elution which showed a decrease in pore occupancy as expected when EVs are released from the cis-membrane surface. FIGS. 7C and 7D illustrate elemental analysis of the membrane surface via EDX and showed an expected reduction of the organic species Carbon (83% reduced) and oxygen (61% reduced)

FIGS. 8A and 8B depict EV recovery as evaluated by an EV sedimentation protocol followed by RNA staining. In FIG. 8A both methods from FIGS. 7A-7D showed excellent overall recovery of EVs. FIG. 8B illustrates nanoparticle tracking analysis (NTA), which confirmed EV recovery yield via counting of EV particles recovered in the elution fraction. The EV sedimentation protocol used VN96 peptide (New England Peptide) and manufacturer's recommended protocol.

Example 4

This example provides results from a cell uptake assay of EVs isolated by capture membranes of the present disclosure.

FIG. 9 depicts characterization of cell culture supernatant from either wild type HEK293T cells or HEK293T-LUC (stably transduced to express firefly luciferase-containing EVs). cell culture supernatants were collected and processed by NPN membrane spin columns. EV solutions were then recovered from the SepCon™ devices and assayed for luciferase activity. These data show capture on NPN does not disrupt the protein cargo of EVs since luciferase is detected in the elution fraction.

FIGS. 10A and 10B depict cell uptake assay of NPN membrane-isolated EVs. FIG. 10A illustrates the results after 24-well plates of WT HEK293T were incubated for 24 hours with 1×10^8 HEK293TLUC EV supernatant processed and concentrated via NPN membrane spin columns. Following this incubation, the supernatant was discarded and cultures were washed 2× with dPBS, then exposed to lysis detergent-containing buffer and assayed for luciferase activity. FIG. 10B shows that Luciferase activity is conveyed to competent wt HEK293T for only those cultures co-incubated with HEK293TLUC EV supernatant with no change observed in the WT control cells incubated with autologous EV supernatant preparations.

Example 5

Figure 11:
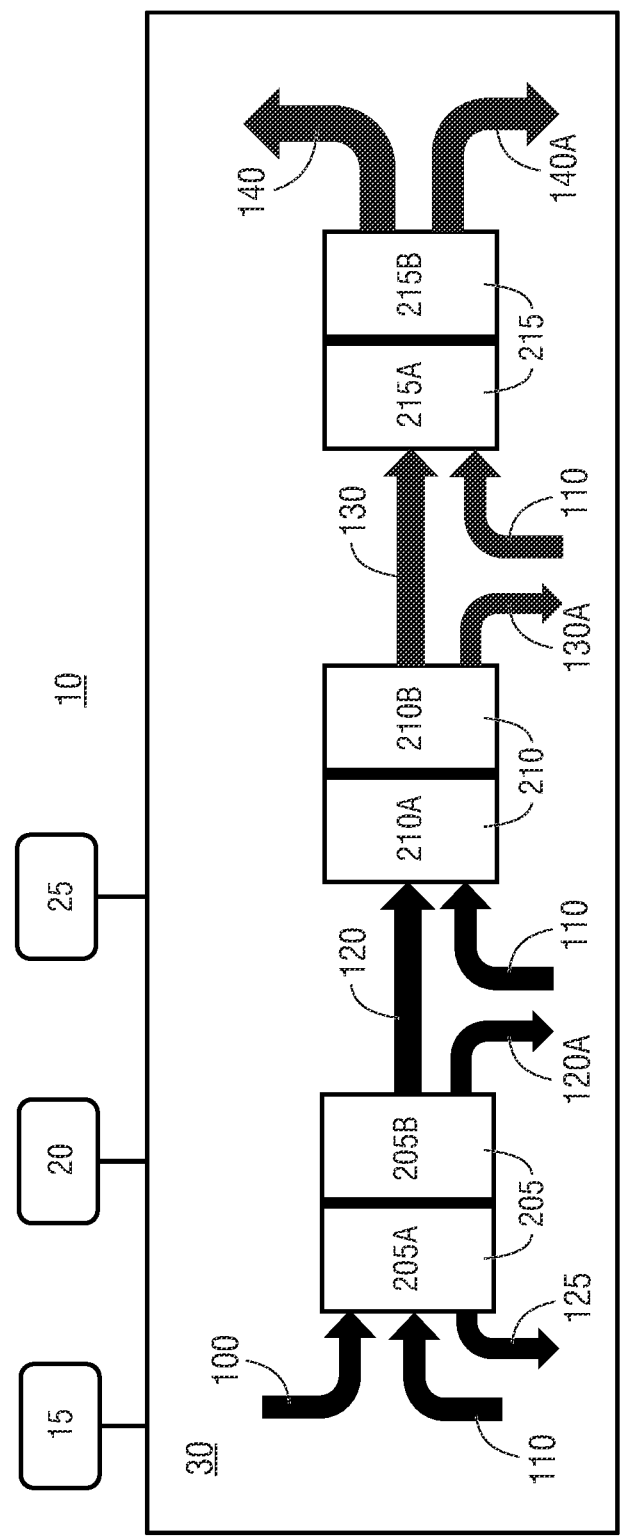
FIG. 11 depicts a workflow of a process of the present disclosure.

FIG. 11 depicts a component diagram describing a model system for various device embodiments of the present invention utilizing a combination of membrane filters including a pre-filter 205, first capture membrane 210, and second capture membrane 215. Second wash filtrate 130a and third washed filtrate 140a are also illustrated.

Figure 12:
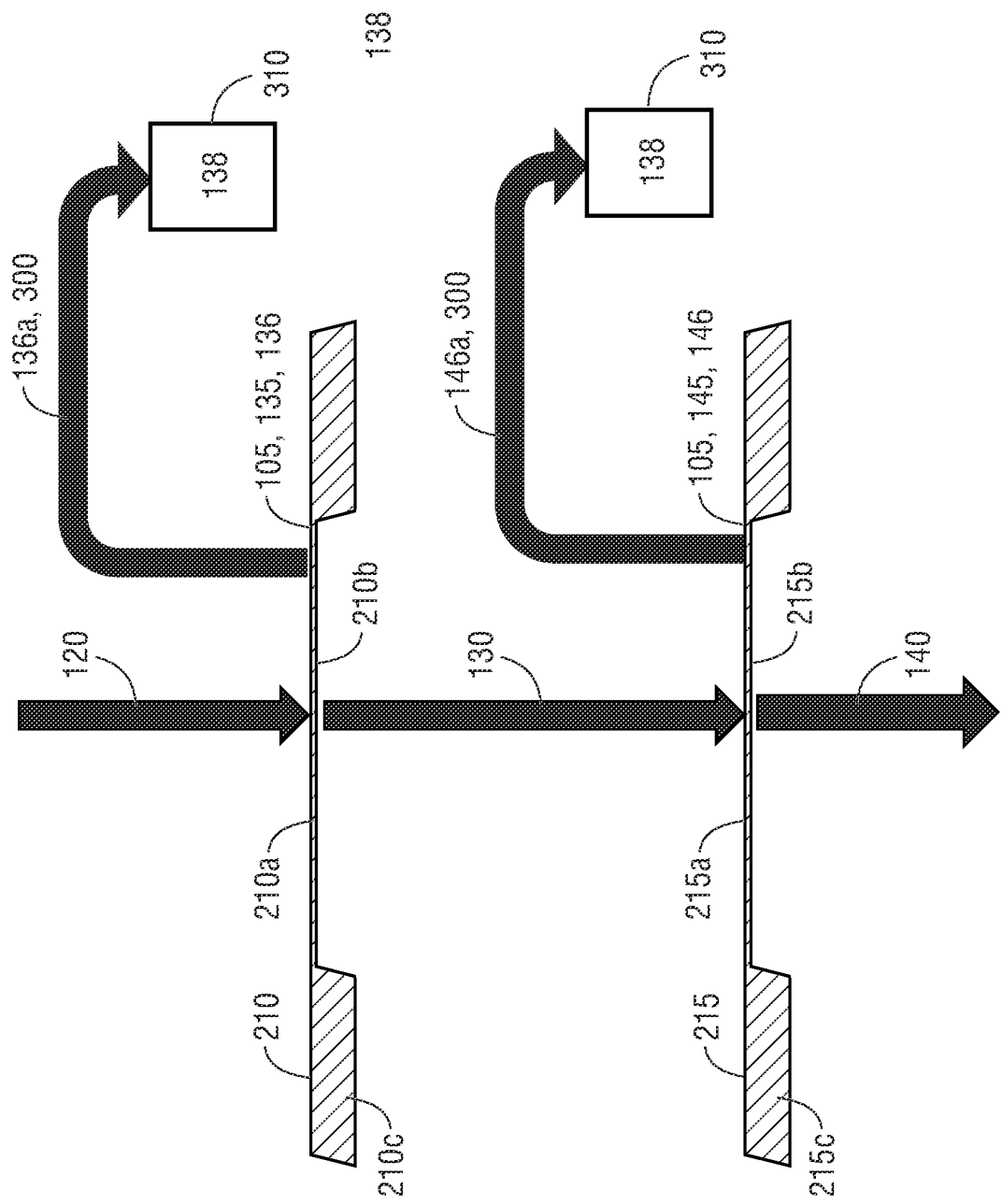
FIG. 12 depicts a workflow of a process of the present disclosure.

FIG. 12 depicts a component diagram describing a model system for one embodiment of the present invention showing a two-membrane system for the capture and elution of EVs from either the first capture membrane 210 or second capture membrane 215. Second captured EVs 146 and second resuspended EVs 146a are also shown.

Figure 13:
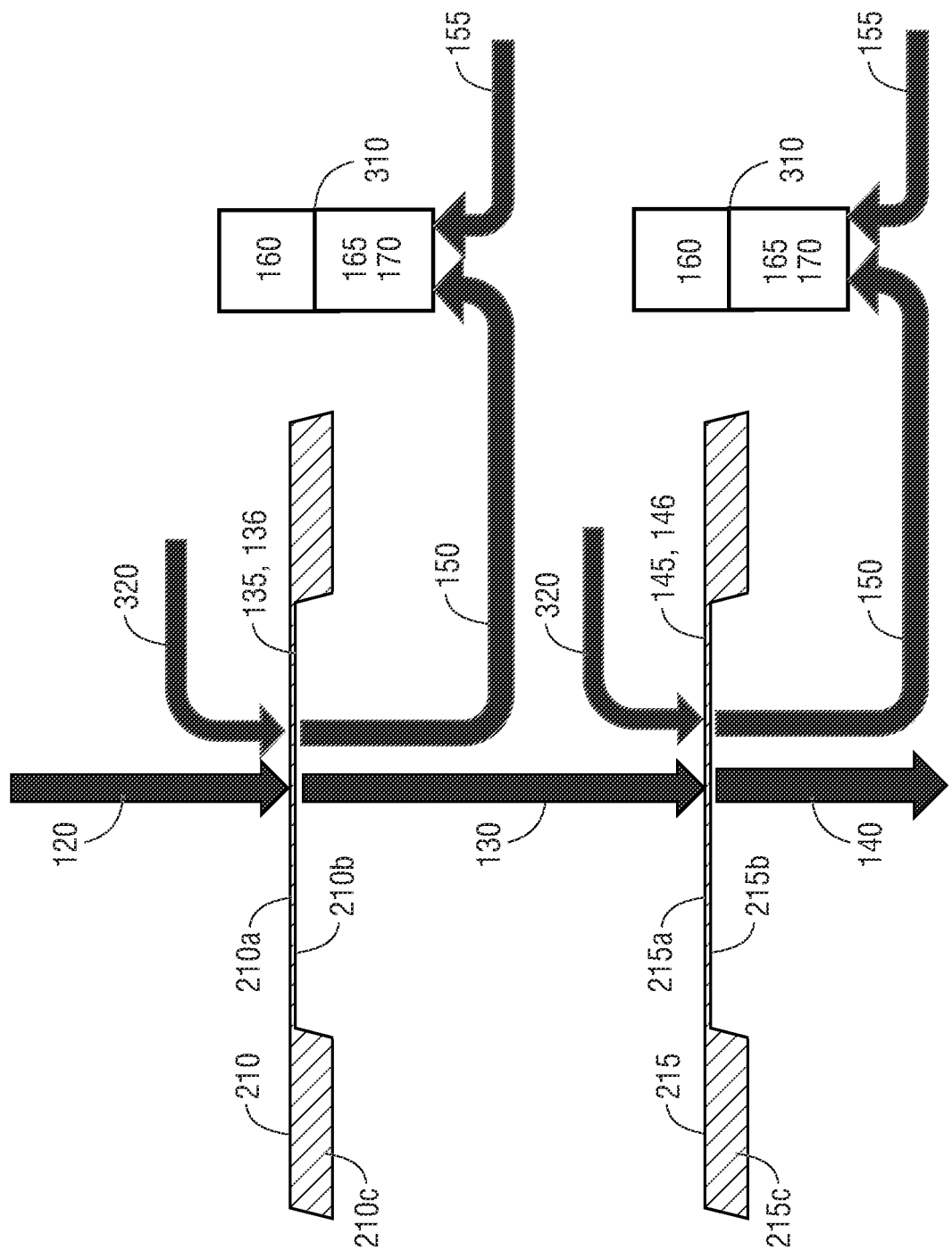
FIG. 13 depicts a workflow of a process of the present disclosure.

FIG. 13 depicts a component diagram describing a model system for one embodiment of the present invention showing a two-membrane system for the capture of EVs from either the first capture membrane 210 or second capture membrane 215, lysis of captured EVs, followed by RNA extraction. Also depicted are first captured membrane support 210c and second capture membrane support 215c.

Figure 14:
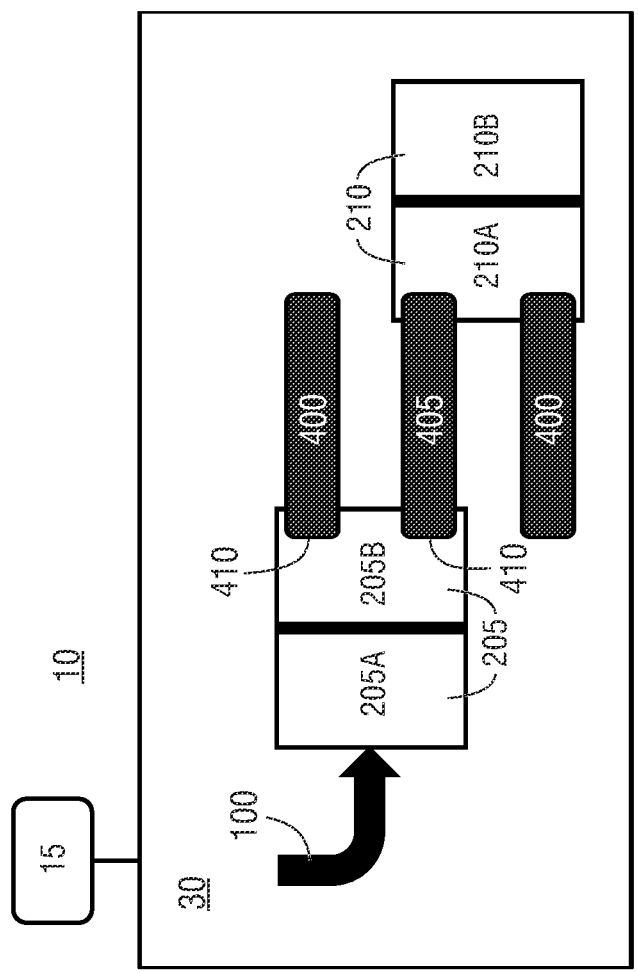
FIG. 14 depicts a workflow of a process of the present disclosure.

FIG. 14 depicts a component diagram describing a model system for one embodiment of the present invention for a microfluidic device 15 composed of first capture membrane 205 fluidically via the trans side to fluidic chambers, a plurality of which are fluidically connected to a second capture membrane 210.

FIGS. 15A-15D are schematics for a microfluidic device 15 utilizing serial filtration. FIG. 15A is a drawing of the cross section of the device showing the upper and lower fluidic chambers and position of the pre-filter membrane and capture membrane. Fluidic channels connect the various membranes to appropriate ports for addressing the cis-side and trans-side of each membrane. FIGS. 15B and 15C are renderings that demonstrate the device membrane contact surfaces and show how fluidic isolation of each membrane surface and a corresponding fluidic chamber (integrated within a plastic body) are achieved. FIG. 15D is an assembled device showing the orientation and fluidic chamber composition of the two device halves.

FIG. 16 is an exemplary stirred cell device 25 of the present invention. FIG. 16A is a cross sectional drawing of the lower-device assembly demonstrating the location of a stir bar within a common fluidic cavity. FIGS. 16B and 16C illustrate, respectively, upper and lower stirred cell device assemblies which show internal fluidic chambers, ports for fluidic access, and mounting positions for four membrane filters. FIG. 16D shows the device of FIGS. 16A-16C, which has been 3D printed from an acrylic composite plastic and fully assembled. Brass fluidic ports have been installed in fluid inlet and outlet ports to facilitate fluidic access to ancillary pumping system(s) not shown. FIG. 16E shows the disassembled device in FIG. 16D showing the position of four membrane filters as installed.

PATENT CITATIONS

1. Carter, J. and Roussie, J. Functionalized Silicon Nanomembranes and Uses Thereof. WO 2019/136398 A1.
2. Huff, J., et al. Devices and methods for sample analysis. WO #2016161402A1.
3. Miller, B. and Rothberg, L. Method for biomolecular sensing and system thereof. U.S. Pat. No. 7,292,349.
4. Roussie, J., et al. Devices, Methods, and Kits for Isolation and Detection of Analytes Using Microslit Filters. WO 2019/036545.
5. Shestopalov, A., et al. Methods for depositing a monolayer on a substrate. U.S. Pat. No. 9,899,212.
6. Striemer, C., and DesOrmeaux, J.-P. Nanoporous Silicon Nitride Membranes, and Methods for Making and Using Such Membranes. U.S. Pat. No. 9,789,239.

What is claimed is:

1. A method for extracellular vesicle isolation comprising the steps of:
   (a) collecting a biofluid sample;
   (b) contacting the biofluid sample with a pre-filtration membrane under normal flow, wherein the pre-filtration membrane is a high permeability silicon nanomembrane and wherein the pre-filtration membrane is functionalized with non-fouling surface treatments by a silanization process, a carbinylation process or an epihalohydrin-based process, and forming a first filtrate and a first retentate;
   (c) optionally, washing the first retentate of the pre-filtration membrane under normal flow;
   (d) contacting the first filtrate from the pre-filtration membrane with a first capture membrane under normal flow, wherein the first capture membrane is a high permeability silicon nanomembrane and wherein the first capture membrane is functionalized with non-fouling surface treatments by a silanization process, a carbinylation process or an epihalohydrin-based process, and forming a second filtrate and a second retentate; and
   (e) optionally, washing the second retentate under normal flow.

2. The method of claim 1 further comprising the step of:
(f) eluting the second retentate from the first capture membrane under normal flow to recover the contents of the second retentate.

3. The method of claim 1 further comprising the step of:
(f) lysing the second retentate from the first capture membrane under normal flow to isolate the contents of the second retentate.

4. The method of claim 2 further comprising the step of:
(g) contacting the second filtrate with a second capture membrane under normal flow thereby forming a third filtrate and a third retentate and eluting the third retentate from the second capture membrane.

5. The method of claim 3 further comprising the step of:
(g) contacting the second filtrate with a second capture membrane under normal flow thereby forming a third filtrate and a third retentate and eluting the third retentate from the second capture membrane.

6. The method of claim 1 wherein the pre-filtration membrane is a microporous silicon nitride nanomembrane or microslit silicon nitride nanomembrane.

7. The method of claim 1 wherein the capture membrane is microporous silicon nitride nanomembrane or nanoporous silicon nitride nanomembrane.

8. A device for extracellular vesicle isolation comprising:
a fluidic device having at least one pre-filtration membrane having a cis-side and a trans-side and at least one capture membrane having a cis-side and a trans-side and wherein the at least one pre-filtration membrane and the at least one capture membrane are high permeability silicon nanomembranes and wherein the at least one capture membrane and the at least one pre-filtration membrane are functionalized with non-fouling surface treatments by a silanization process, a carbinylation process or an epihalohydrin-based process;
a micro-flea magnetic stirrer or a magnetic flagella;
at least one fluidic chamber in fluidic communication with the cis-side of the pre-filtration membrane;
at least one fluidic chamber in fluidic communication with the trans-side of the pre-filtration membrane and the cis-side of the capture membrane;
the cis-side and trans-side of the pre-filtration membrane oppose each other and their respective cis-side and trans-side fluidic chambers and are in fluid communication with each other by way of a plurality of openings in the pre-filtration membrane;
the cis-side of the capture membrane is in fluidic communication with the trans-side of the pre-filtration membrane by way of its connection with the trans-side fluidic channel of the pre-filtration membrane; and
wherein the device is configured such that flow through the device is normal flow.

9. The device of claim 8 wherein the at least one pre-filtration membrane is a microporous silicon nitride nanomembrane or microslit silicon nitride nanomembrane.

10. The device of claim 8 wherein the at least one capture membrane is a microporous silicon nitride nanomembrane or nanoporous silicon nitride nanomembrane.

11. A kit for extracellular vesicle isolation comprising:
at least one reagent;
at least one solution;
instructions for using the kit;
a fluidic device having at least one pre-filtration membrane having a cis-side and a trans-side and at least one capture membrane having a cis-side and a trans-side and wherein the at least one pre-filtration membrane and the at least one capture membrane are high permeability silicon nanomembranes and wherein the at least one capture membrane and the at least one pre-filtration membrane are functionalized with non-fouling surface treatments by a silanization process, a carbinylation process or an epihalohydrin-based process;
a micro-flea magnetic stirrer or a magnetic flagella;
at least one fluidic chamber in fluidic communication with the cis-side of the pre-filtration membrane;
at least one fluidic chamber in fluidic communication with the trans-side of the pre-filtration membrane and the cis-side of the capture membrane;
the cis-side and trans-side of the pre-filtration membrane oppose each other and their respective cis-side and trans-side fluidic chambers and are in fluid communication with each other by way of a plurality of openings in the pre-filtration membrane;
the cis-side of the capture membrane is in fluidic communication with the trans-side of the pre-filtration membrane by way of its connection with the trans-side fluidic channel of the pre-filtration membrane; and
wherein the fluidic device is configured such that flow through the device is normal flow.

12. The kit of claim 11 wherein the at least one pre-filtration membrane is a microporous silicon nitride nanomembrane or microslit silicon nitride nanomembrane.

13. The kit of claim 11 wherein the at least one capture membrane is a microporous silicon nitride nanomembrane or nanoporous silicon nitride nanomembrane.

* * * * *